(12) United States Patent
Pittman

(10) Patent No.: US 7,797,570 B2
(45) Date of Patent: Sep. 14, 2010

(54) SYSTEM AND METHOD FOR FAILOVER OF iSCSI TARGET PORTAL GROUPS IN A CLUSTER ENVIRONMENT

(75) Inventor: Joseph C. Pittman, Apex, NC (US)

(73) Assignee: NetApp, Inc., Sunnyvale, CA (US)

( * ) Notice: Subject to any disclaimer, the term of this patent is extended or adjusted under 35 U.S.C. 154(b) by 917 days.

(21) Appl. No.: 11/290,198

(22) Filed: Nov. 29, 2005

(65) Prior Publication Data

US 2007/0168693 A1 Jul. 19, 2007

(51) Int. Cl.
*G06F 11/00* (2006.01)
(52) U.S. Cl. ................................... 714/5; 714/6; 714/8
(58) Field of Classification Search ............ 714/4
See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,802,366 A | 9/1998 | Row et al. | |
| 5,819,292 A | 10/1998 | Hitz et al. | |
| 5,892,955 A | 4/1999 | Ofer | |
| 5,894,588 A | 4/1999 | Kawashima et al. | |
| 5,931,918 A | 8/1999 | Row et al. | |
| 5,941,972 A | 8/1999 | Hoese et al. | |
| 5,963,962 A | 10/1999 | Hitz et al. | |
| 5,975,738 A | 11/1999 | DeKoning et al. | |
| 6,038,570 A | 3/2000 | Hitz et al. | |
| 6,061,770 A * | 5/2000 | Franklin ............ | 711/162 |
| 6,065,037 A | 5/2000 | Hitz et al. | |
| 6,128,734 A | 10/2000 | Gross et al. | |
| 6,185,695 B1 * | 2/2001 | Murphy et al. ........ | 714/4 |
| 6,425,035 B2 | 7/2002 | Hoese et al. | |
| 6,654,902 B1 | 11/2003 | Brunelle et al. | |
| 6,671,773 B2 | 12/2003 | Kazar et al. | |
| 6,708,265 B1 | 3/2004 | Black | |
| 6,757,695 B1 | 6/2004 | Noveck et al. | |
| 6,760,304 B2 | 7/2004 | Uzrad-Nali et al. | |
| 7,127,633 B1 * | 10/2006 | Olson et al. ........... | 714/4 |
| 7,257,730 B2 * | 8/2007 | Spry .................... | 714/4 |

(Continued)

OTHER PUBLICATIONS

"Notification of Transmittal of the International Search Report and the Written Opinion of the International Searching Authority, or the Declaration," International Filing Date: Nov. 28, 2006, International Application No. PCT/US2006/045536, Applicant: Network Applicance, Inc., Date of Mailing: Jun. 9, 2008, pp. 1-13.

(Continued)

*Primary Examiner*—Scott T Baderman
*Assistant Examiner*—Kamini Patel
(74) *Attorney, Agent, or Firm*—Cesari and McKenna, LLP

(57) ABSTRACT

A system and method for the failover of iSCSI target portal groups (TPGs) is provided. Each network portal within a storage system is associated with a network portal data structure identifying a destination storage system in the event of failover/takeover operation. A management module ensures that all network portals associated with a target portal group have the same destination as a failover storage system. During a failover operation, all network portals within a TPG failover to the same destination storage system.

27 Claims, 17 Drawing Sheets

U.S. PATENT DOCUMENTS

| | | | |
|---|---|---|---|
| 7,260,678 B1 | 8/2007 | Agarwal et al. | |
| 7,293,195 B1 * | 11/2007 | Watanabe et al. | 714/9 |
| 7,296,068 B1 | 11/2007 | Sarma et al. | |
| 7,325,111 B1 * | 1/2008 | Jiang | 711/162 |
| 7,363,382 B1 * | 4/2008 | Bakke et al. | 709/230 |
| 7,376,796 B2 * | 5/2008 | Corbett et al. | 711/141 |
| 7,409,494 B2 | 8/2008 | Edwards et al. | |
| 7,523,201 B2 | 4/2009 | Lee et al. | |
| 7,546,302 B1 * | 6/2009 | Coatney et al. | 1/1 |
| 7,587,558 B1 * | 9/2009 | Smith et al. | 711/152 |
| 7,613,947 B1 * | 11/2009 | Coatney et al. | 714/6 |
| 7,693,877 B1 * | 4/2010 | Zasman | 711/161 |
| 7,698,501 B1 * | 4/2010 | Corbett et al. | 711/114 |
| 7,711,683 B1 * | 5/2010 | Watanabe et al. | 1/1 |
| 2002/0099914 A1 | 7/2002 | Matsunami et al. | |
| 2003/0061319 A1 * | 3/2003 | Manzardo | 709/221 |
| 2003/0061491 A1 | 3/2003 | Jaskiewicz et al. | |
| 2003/0097611 A1 | 5/2003 | Delaney et al. | |
| 2003/0115350 A1 | 6/2003 | Uzrad-Nali et al. | |
| 2003/0120743 A1 | 6/2003 | Coatney et al. | |
| 2003/0126240 A1 | 7/2003 | Vosseler | |
| 2003/0182593 A1 * | 9/2003 | Emberty et al. | 714/6 |
| 2003/0237018 A1 * | 12/2003 | Baba | 714/4 |
| 2004/0064815 A1 | 4/2004 | Uzrad-Nali et al. | |
| 2004/0139167 A1 | 7/2004 | Edsall et al. | |
| 2004/0156393 A1 | 8/2004 | Gupta et al. | |
| 2004/0268017 A1 | 12/2004 | Uzrad-Nali et al. | |
| 2005/0005001 A1 * | 1/2005 | Hara et al. | 709/221 |
| 2005/0138466 A1 | 6/2005 | Spry | |
| 2005/0259632 A1 * | 11/2005 | Malpani et al. | 370/351 |
| 2006/0123273 A1 * | 6/2006 | Kalos et al. | 714/100 |
| 2007/0101069 A1 * | 5/2007 | Corbett et al. | 711/141 |
| 2007/0124341 A1 * | 5/2007 | Lango et al. | 707/202 |
| 2007/0124453 A1 * | 5/2007 | Slaughter et al. | 709/223 |
| 2007/0244908 A1 * | 10/2007 | Rajan | 707/10 |
| 2007/0276878 A1 * | 11/2007 | Zheng et al. | 707/202 |

OTHER PUBLICATIONS

Murphy, Matthew R., "iSCSI-based Storage Area Networks for Disaster Recovery Operations," XP-002480289, Apr. 5, 2005, Retrieved from Internet: <http://66.160.138.180/thesis.pdf>, Retrieved on May 14, 2008, all pages.

Satran, John et al., "RFC: 3720 Internet Small Computer Systems Interface (iSCSI)," XP002480290, Apr. 2004, Retrieved from Internet: <http://www.javvin.com/protocol/rfc3720.pdf>, Retrieved on May 14, 2008, all pages.

American National Standards Institute, Inc.; American National Standard for Information Technology; Fibre Channel- Physical and Signaling Interface (FC-PH); Nov. 14, 1994.

American National Standards Institute, Inc.; American National Standard for Information Technology—Fibre Channel Arbitrated Loop (FC-AL-2); Dec. 8, 1999.

SNIA Storage Networking Industry Association; Common Internet File System (CIFS), Version: CIFS-Spec. 0.9. Work Group in Progress.

Fibre Channel Generic Services—3 (FC-GS-3), Revision 6.0; NCITS Working Draft Proposed American National Standard for Information Technology; Nov. 24, 1999.

Draft Proposed American National Standard for Information Systems—SCSI-3 Primary Commands; Mar. 28, 1997.

New Identifier Formats Based on IEEE Registration; http://standards.ieee.org/regauth/oui/tutorials/fibreformat.html; Accessed on Aug. 6, 2001.

Soltis S et al. "The Design and Performance of a Shared Disk File System for IRIX" NASA Goddard Space Flight Center Conference on Mass Storage and Technologies in Cooperation with the IEEE Symposium on Mass Storage Systems, Mar. 23, 1998, pp. 1-17, XP002194621.

Hu Yoshida: "LUN Security Considerations for Storage Area Networks" Hitachi Data Systems, 1999, pp. 1-7, XP002185193.

Patterson, D., et al., A Case for Redundant Arrays of Inexpensive Disks (RAID), SIGMOD International Conference on Management of Data, Chicago, IL, USA, Jun. 1-3, 1988, SIGMOD Record (17)3:109-16 (Sep. 1988).

Pittman, Joseph C. "System and Method for Providing a Unified iSCSI Target with a Plurality of Loosely Coupled iSCSI Front Ends", U.S. Appl. No. 11/254,397, filed Oct. 20, 2005, 57 pages.

* cited by examiner

| VLUN | PLUN |
|---|---|
| 0 | 4096 |
| 1 | 5000 |
| 2 | |
| ⋮ | ⋮ |

FIG. 15

SYSTEM AND METHOD FOR FAILOVER OF ISCSI TARGET PORTAL GROUPS IN A CLUSTER ENVIRONMENT

FIELD OF THE INVENTION

The present invention relates to storage systems and, more particularly, to enabling iSCSI target portal group failover among a plurality of storage systems.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). RAID implementations enhance the reliability/integrity of data storage through the redundant writing of data "stripes" across a given number of physical disks in the RAID group, and the appropriate storing of redundant information (parity) with respect to the striped data. As described herein, a volume typically comprises at least one data disk and one associated parity disk (or possibly data/parity partitions in a single disk) arranged according to a RAID 4 or equivalent high-reliability implementation. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of data containers, such as files and blocks. For example, each "on-disk" file may be implemented as a set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not over-write data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network. In the case of block-based protocol packets, the client requests (and storage system responses) address the information in terms of block addressing on disk using, e.g., a logical unit number (lun). These block-base protocol packets may comprise SCSI encapsulated in TCP/IP (iSCSI).

In such block-based storage system environments, the luns exported by a storage system are only available by accessing that particular system. It should be noted that the term "lun" as used herein may refer to a logical unit number and/or a logical unit. A noted disadvantage of such environments arises when the storage system suffers an error or otherwise becomes inaccessible due to, e.g., a failure in network connectivity. As luns are only available by accessing the storage system, those luns become inaccessible should the storage system become inaccessible. Such inaccessibility is unacceptable for many users of SANs who require high, e.g., "24×7" data availability.

To improve the availability of luns, storage systems may be coupled together in a cluster with the property that when one storage system fails the other begins servicing data access requests directed to the failed storage system's luns. In such an environment, two storage systems are coupled to form a storage system cluster. Each storage system services data access requests directed to its luns and only services data access requests directed to the other storage system's luns after a failover operation has occurred. During the failover operation, the surviving storage system, i.e., the storage system that has not suffered the error condition, assumes the identity of the failed storage system by, for example, assigning the failed storage system's network portals, i.e., the Internet Protocol (IP) addresses and TCP port numbers, to network adapters available on the surviving storage system. However, a noted disadvantage of such clusters is that they are limited to two storage systems.

In certain distributed environments such as that described in U.S. patent application Ser. No. 11/254,397, entitled SYSTEM AND METHOD FOR PROVIDING A UNIFIED ISCSI TARGET WITH A PLURALITY OF LOOSELY COUPLED ISCSI FRONT ENDS, a plurality of storage systems may be utilized as front ends to a cluster comprising network elements (N-modules) and disk elements (D-modules). In such environments, a conventional TCP/IP failover pairing may be established between any two N-modules.

Similarly, in a storage system environment utilizing iSCSI, all network portals may failover to one storage system. The iSCSI protocol defines a network portal as an IP address and a TCP port number from which a computer provides iSCSI services. In accordance with the iSCSI protocol each network portal may belong to exactly one target portal group (TPG). All connections within an iSCSI session must use network portals within the same TPG. Furthermore, a given initiator may have at most one session in progress to an iSCSI target over a given TPG at a given time. A noted disadvantage of the prior art arises when pair-wise cluster extends to an N-way cluster having a plurality of storage systems to which a failover may occur. Should an N-module fail in pair-wise cluster environments and all of its network portals are moved to a single surviving N-module, the surviving N-module may become overloaded. However, in a N-way cluster, a storage system administrator typically configures the system to ensure that all network portals within a TPG failover to the same surviving N-module. If all network portals within a TPG do not failover to the same N-module, initiators may send data access commands to a network portal residing on an N-module that is different from that of the other network portals of the TPG, thereby resulting in error conditions within the iSCSI session. The present invention is directed to a system and method for ensuring that all network portals within a TPG failover to the same destination (e.g., N-module).

SUMMARY OF THE INVENTION

The disadvantages of the prior art are overcome by providing a system and method for configuring a cluster of interconnected storage systems to permit iSCSI target portal group (TPG) failover. Illustratively, each storage system of the cluster comprises one or more network elements (N-module) and disk elements (D-module) operatively interconnected by a cluster switching fabric. The present invention permits the cluster to be presented to an initiator (client) as a unified iSCSI target by encoding each N-module to function as one of a plurality of "front ends" of the iSCSI target. As a front end, any N-module may cooperate with clients to open (establish) one or more iSCSI sessions and thereafter receive data access requests directed to the unified iSCSI target. A data access request received by an N-module is forwarded from that module to an appropriate D-module of the cluster for processing.

A management module (M-module) is operatively interconnected with the cluster to provide a set of user interface tools that enables an administrator to manage network portals. A replicated database (RDB) executes as a user application on each storage system and interfaces with the M-module to centralize network portal information within the cluster. Modifications to the network portals are stored within the RDB. The RDB alerts each N-module of a change, which causes the N-module to retrieve the changed information from the RDB and update its local configuration.

The M-module includes a failover monitor process that ensures that network portal configurations, including intended failover destinations, are configured so that all network portals belonging to the same TPG fail over to the same N-module. Should the administrator attempt to configure failover destinations so that one or more network portals within the TPG failover to different N-modules, the M-module generates an error message and alerts (notifies) the administrator of the incompatible configuration. However, if the configuration is acceptable, an appropriate network portal data structures are updated and stored in the RDB so that they are accessible to all N-modules of the cluster.

When a failure condition occurs, the M-module detects the failure condition and alerts the surviving N-modules, i.e., those N-modules that have not suffered an error condition, of the failure. The surviving N-modules access the RDB to determine whether they are to assume the identities of any network portals of the failed N-modules by e.g., examining the network portal data structures. Upon determining that an N-module is the failover destination for one or more network portals, the N-module assumes the identities of all network portals within the TPG. Once the identities of the network portals have been assumed, the N-module begins processing data access requests directed to the network portals of the TPG.

BRIEF DESCRIPTION OF THE DRAWINGS

The above and further advantages of invention may be better understood by referring to the following description in conjunction with the accompanying drawings in which like reference numerals indicate identical or functionally similar elements:

FIG. 15 is a schematic block diagram of a lun map in accordance with an embodiment of the present invention;

DETAILED DESCRIPTION OF AN ILLUSTRATIVE EMBODIMENT

A. Cluster Environment

Figure 1:
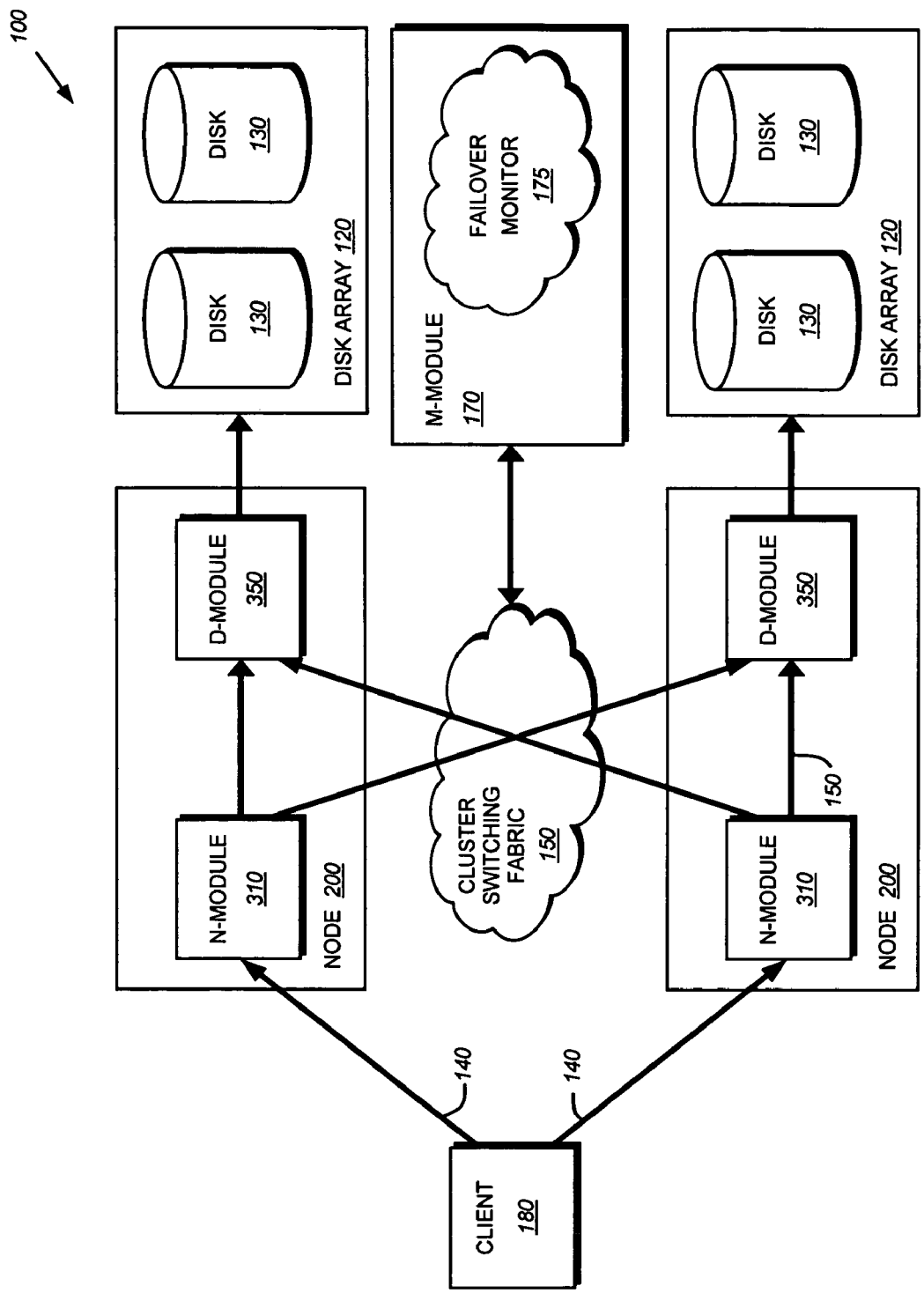
FIG. 1 is a schematic block diagram of a plurality of nodes interconnected as a cluster in accordance with an embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-module 310) and a disk element (D-module 350). The N-module 310 includes functionality that enables the node 200 to connect to clients 180 over a computer network 140, while each D-module 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Patent Application Publication No. US 2002/0116593 titled METHOD AND SYSTEM FOR RESPONDING TO FILE SYSTEM REQUESTS, by M. Kazar et al. published Aug. 22, 2002, now issued as U.S. Pat. No. 6,671,773 on Dec. 30, 2003. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200 comprising one N-module and one D-module should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

Also interconnected with the cluster switching fabric 150 is a management module (M-module) 170 adapted to execute various user interface (UI) and management functions for the cluster. Illustratively, the M-module 170 processes commands entered by an administrator for maintaining network portal configuration information in accordance with an illustrative embodiment of the present invention. In the illustrative embodiment, the M-module 170 includes a failover monitor process 175 that monitors each N/D-module and initiates a failover operation upon detecting the failure of a N/D-module. Additionally, the failover monitor 175 ensures that an administrator configures failover in the cluster so that all of the network portals in a target portal group (TPG) will failover to the same N-module.

B. Storage System Node

Figure 2:
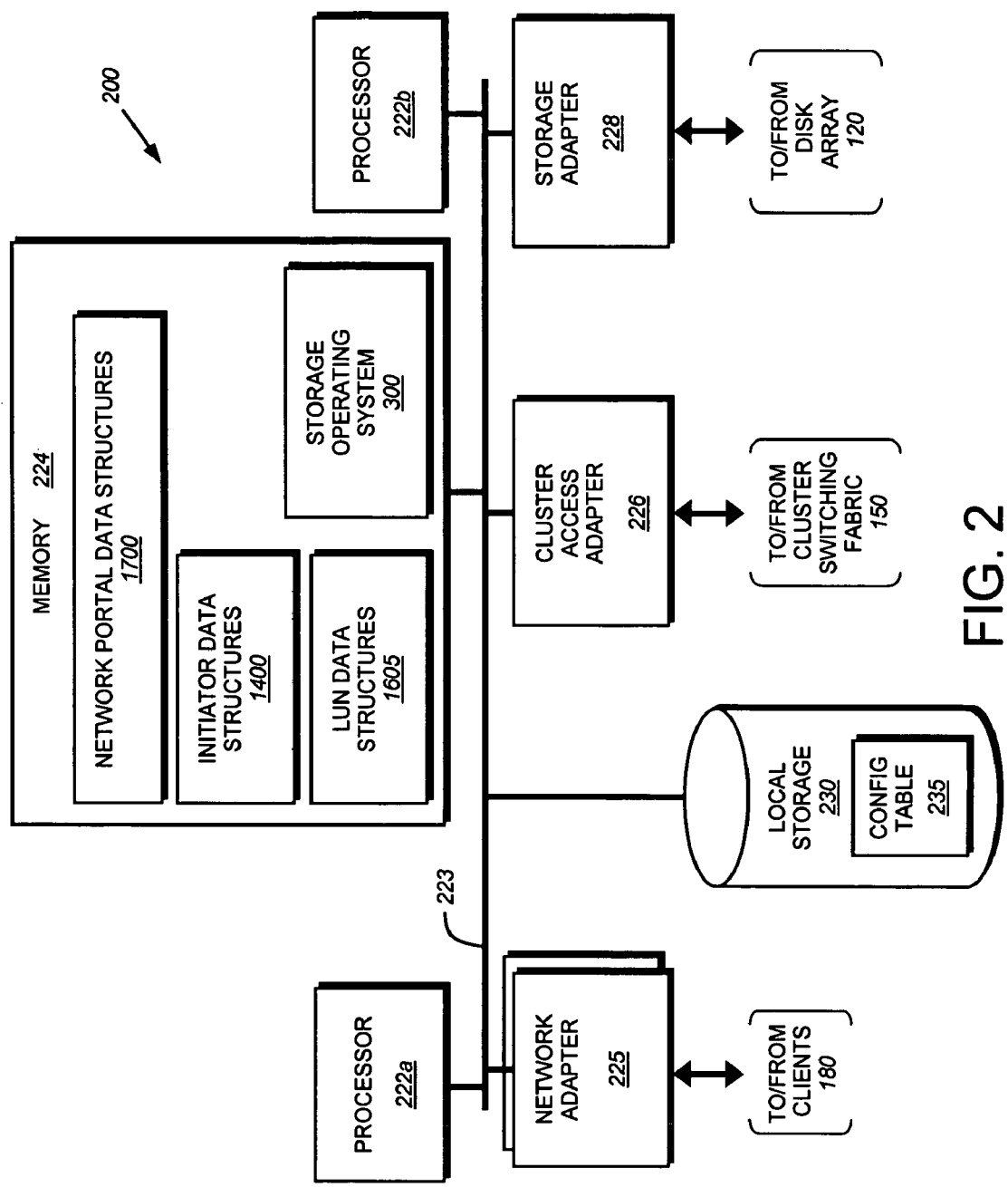
FIG. 2 is a schematic block diagram of a node in accordance with an embodiment of the present invention.

FIG. 2 is a schematic block diagram of a node 200 that is illustratively embodied as a storage system comprising a plurality of processors 222a,b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235) provided by one or more management processes that execute as user mode applications 1100 (see FIG. 11). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 310 on the node, while the other processor 222b executes the functions of the D-module 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures, such as initiator data structures 1400, lun data structures 1605 and network portal data structures 1700. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The network adapter 225 may comprise a conventional network interface controller (NIC) or may, in alternate embodiments, comprise a TCP/IP offload engine (TOE) and/or an iSCSI target host bus adapter (HBA), each of which may provide a level of acceleration for use with the iSCSI protocol. In alternate embodiments, there may be a plurality of network adapters, each of which may accept iSCSI connections.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

Figure 3:
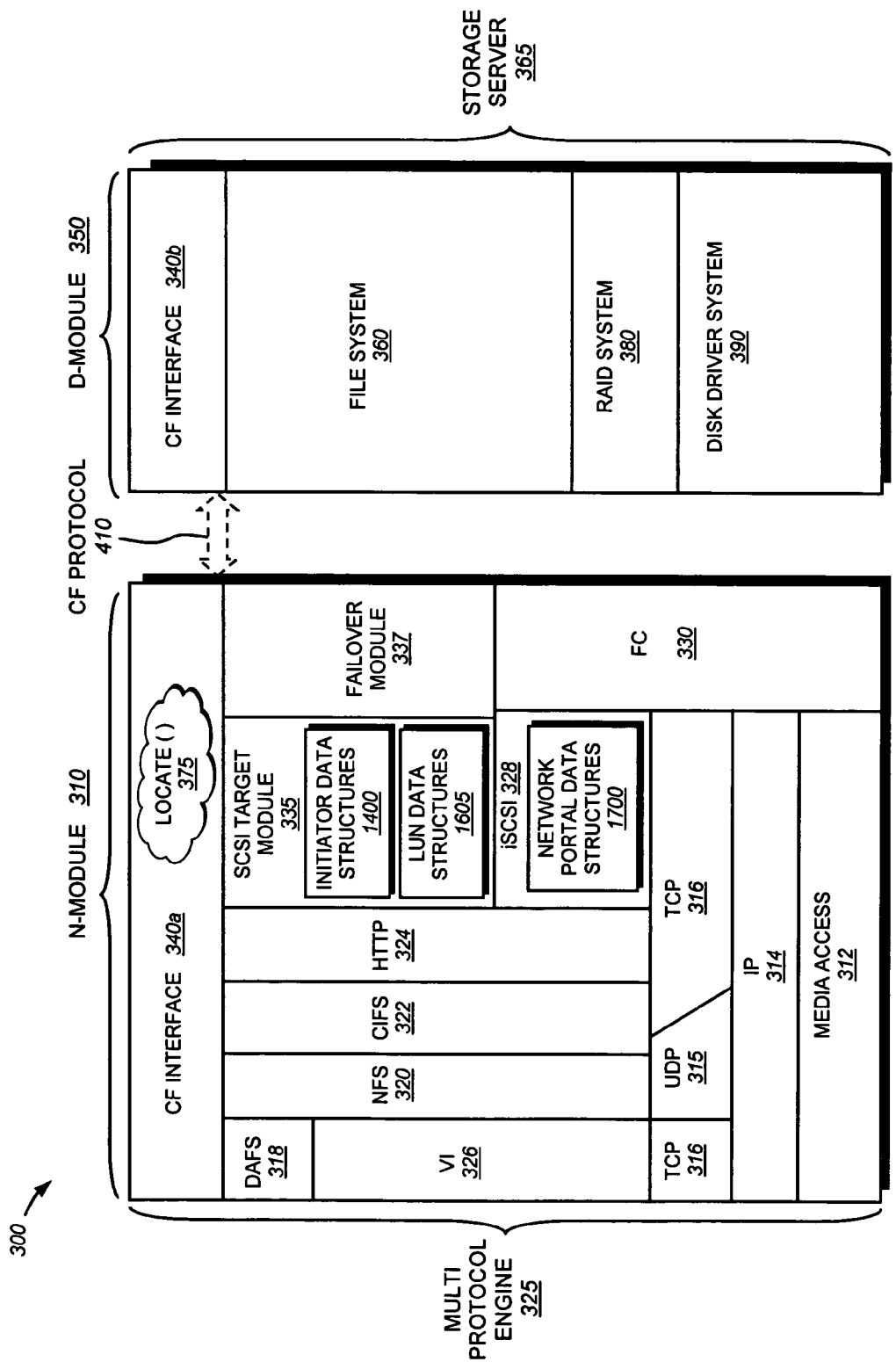
FIG. 3 is a schematic block diagram of a storage operating system that may be advantageously used with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 1110 (see FIG. 11), in response to a user (system administrator) issuing commands to the node 200. The SCSI target module 335 is generally disposed between the FC and iSCSI drivers 328, 330 and the file system 360 to provide a translation layer of the virtualization system between the logical unit space and the file system space, where logical units are represented as named objects within the file system space.

Illustratively, the SCSI target module 335 generates and maintains a number of initiator data structures 1400 and/or lun data structures 1605. The creation of initiator data structures and lun data structures is further described in U.S. patent application Ser. No. 10/619,122 entitled, SYSTEM AND METHOD FOR OPTIMIZED LUN MASKING, by Herman Lee, et al., now issued as U.S. Pat. No. 7,523,201 on Apr. 21, 2009, which is hereby incorporated by reference. As described further below, an initiator data structure 1400 is generated for each iSCSI initiator that logs into the N-module. The initiator data structure 1400 contains various data associated with the initiator. Similarly, a lun data structure 1605 is associated with each lun exported by the storage system and as described further below, is utilized to store various metadata related to the luns. Similarly, the iSCSI module 328 generates and maintains one or more network portal data structures 1700. The network portal data structures 1700, described further below, are utilized by the storage operating system 300 for tracking various data relating to a network portal, including, e.g., to which TPG it belongs.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a cluster fabric (CF) interface module 340a,b adapted to implement intra-cluster communication among the modules, including D-module-to-D-module communication.

The protocol layers, e.g., the NFS/CIFS layers and the iSCSI/FC layers in conjunction with the SCSI target layer, of the N-module 310 function as protocol servers that translate file-based and block based data access requests from clients. As part of the processing of these requests, the N-module may have to request data services from the D-Module 350. This may be achieved via file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. A data access request received by an N-Module is processed by that N-Module. As part of the processing, the N-module may have to send requests to one or more D-modules. A Locate( ) function 375 is illustratively implemented within CF interface 340a. The Locate( ) function 375 interfaces with a volume location database, described further below, to identify the proper D-module to which a data access request should be forwarded. Generally, the Locate( ) function 375 identifies the D-module that is currently serving the volume to which the data access request is directed.

Further to the illustrative embodiment, the N-module 310 and D-module 350 are implemented as separately-scheduled processes of storage operating system 300; however, in an alternate embodiment, the modules may be implemented as pieces of code within a single operating system process. Communication between an N-module and D-module is thus illustratively effected through the use of message passing between the modules although, in the case of remote communication between an N-module and D-module of different nodes, such message passing occurs over the cluster switching fabric 150. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol is the SpinFS protocol available from Network Appliance, Inc. The SpinFS protocol is described in the above-referenced U.S. Pat. No. 6,671,773.

The CF interface module 340 implements the CF protocol for communicating file system commands among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340a on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340b on D-module 350 de-encapsulates the CF message and processes the file system command.

Figure 4:
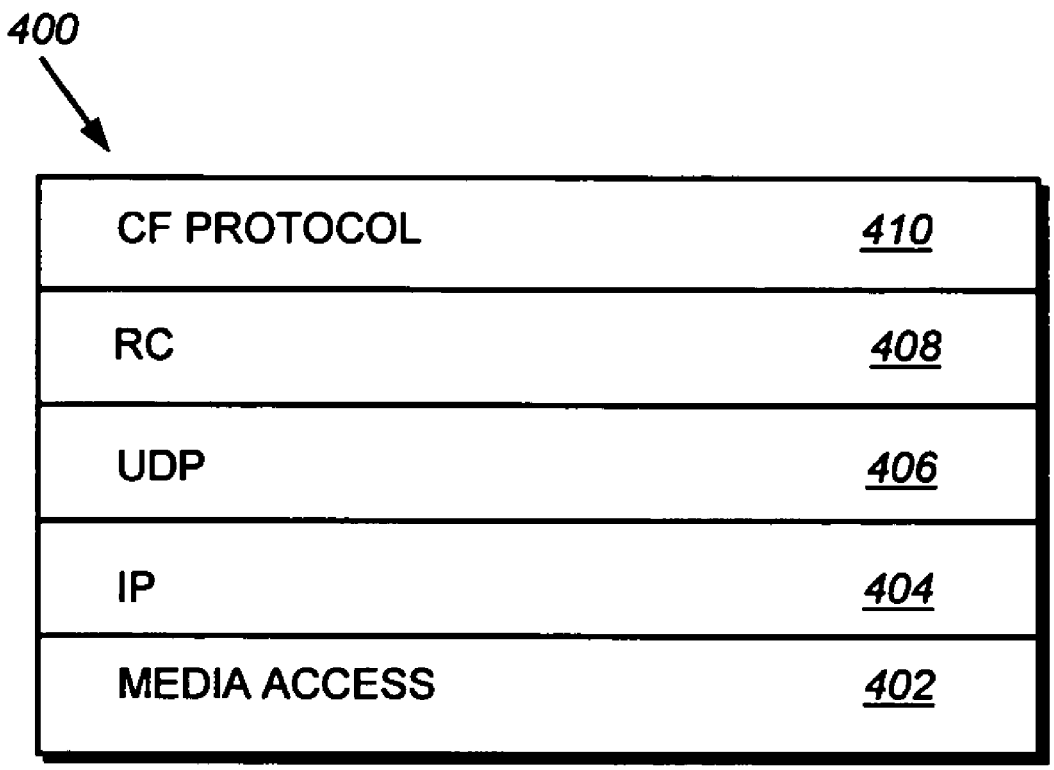
FIG. 4 is a schematic block diagram illustrating the format of a cluster fabric (CF) message in accordance with an embodiment of with the present invention.

FIG. 4 is a schematic block diagram illustrating the format of a CF message 400 in accordance with an embodiment of with the present invention. The CF message 400 is illustratively used for RPC communication over the switching fabric 150 between remote modules of the cluster 100; however, it should be understood that the term "CF message" may be used generally to refer to LPC and RPC communication between modules of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands. Illustratively, the CF protocol is datagram based and, as such, involves transmission of messages or "envelopes" in a reliable manner from a source (e.g., an N-module 310) to a destination (e.g., a D-module 350). The RC layer 408 implements a reliable transport protocol that is adapted to process such envelopes in accordance with a connectionless protocol, such as UDP 406.

Figure 5:
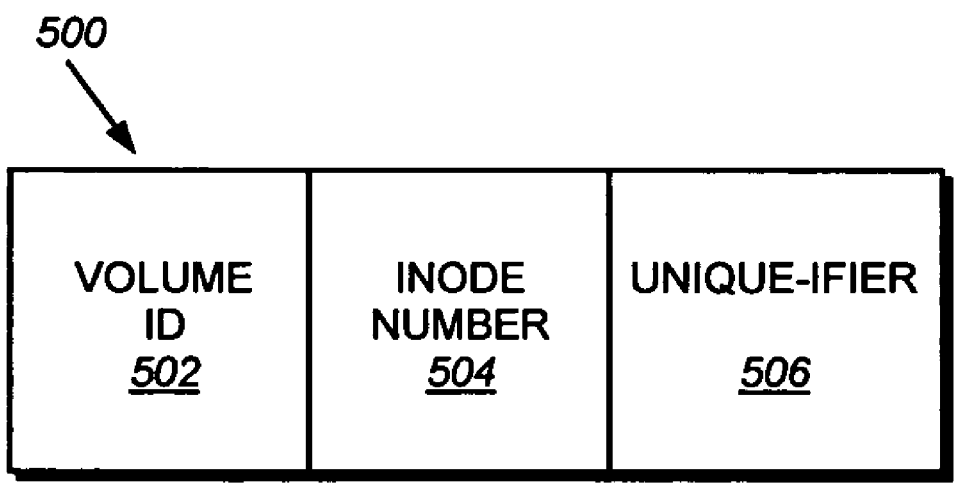
FIG. 5 is a schematic block diagram illustrating the format of a data container handle in accordance with an embodiment of the present invention.

A data container, e.g., a file or logical unit, is accessed in the file system using a data container handle. FIG. 5 is a schematic block diagram illustrating the format of a data container handle 500 including a volume ID field 502, an inode number field 504 and a unique-ifier field 506. The volume ID field 502 contains a global identifier (within the cluster 100) of the volume within which the data container resides. The inode number field 504 contains an inode number of an inode (within an inode file) pertaining to the data container. The unique-ifier field 506 contains a monotonically increasing number that uniquely identifies the data container handle 500. The unique-ifier is particularly useful in the case where an inode number has been deleted, reused and reassigned to a new data container. The unique-ifier distinguishes that reused inode number in a particular data container from a potentially previous use of those fields.

E. File System Organization

Figure 6:
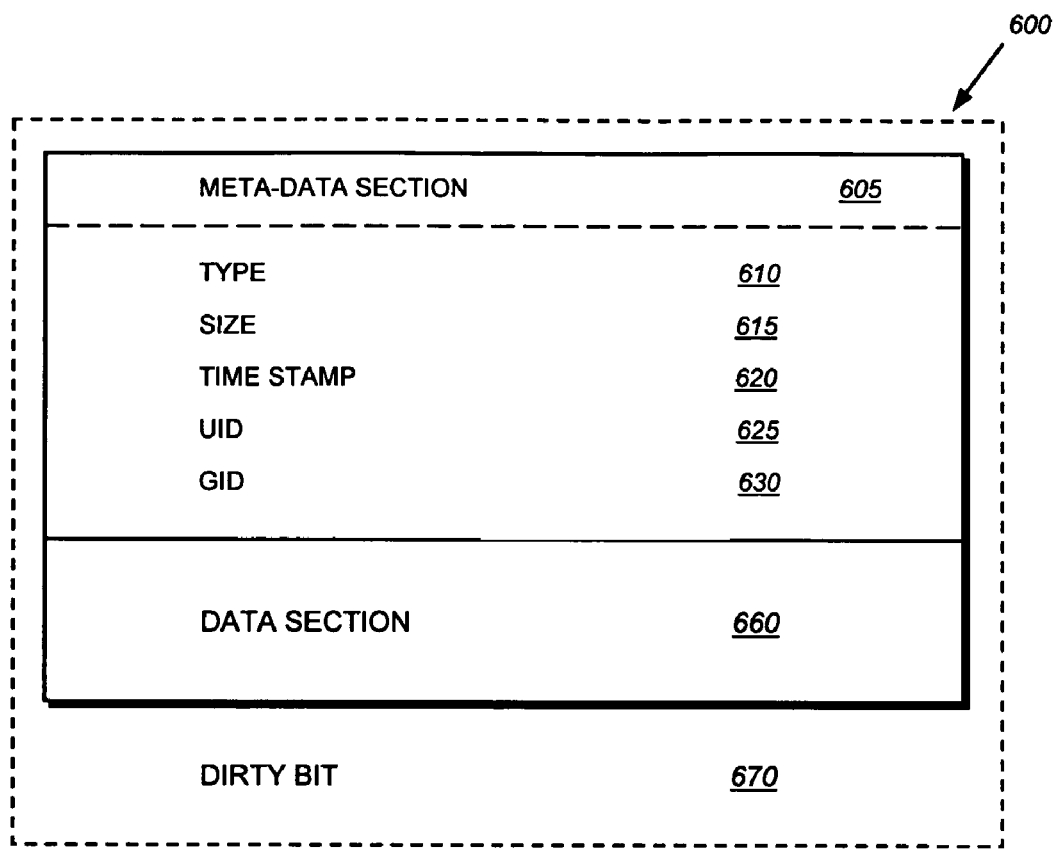
FIG. 6 is a schematic block diagram of an exemplary inode in accordance with an embodiment of the present invention.

In the illustrative embodiment, a data container is represented in the write-anywhere file system as an inode data structure adapted for storage on the disks 130. FIG. 6 is a schematic block diagram of an inode 600, which preferably includes a meta-data section 605 and a data section 660. The information stored in the meta-data section 605 of each inode 600 describes the data container (e.g., a file) and, as such, includes the type (e.g., regular, directory, vdisk) 610 of file, its size 615, time stamps (e.g., access and/or modification time) 620 and ownership, i.e., user identifier (UID 625) and group ID (GID 630), of the file. The contents of the data section 660 of each inode may be interpreted differently depending upon the type of file (inode) defined within the type field 610. For example, the data section 660 of a directory inode contains meta-data controlled by the file system, whereas the data section of a regular inode contains file system data. In this latter case, the data section 660 includes a representation of the data associated with the file.

Specifically, the data section 660 of a regular on-disk inode may include file system data or pointers, the latter referencing 4 KB data blocks on disk used to store the file system data. Each pointer is preferably a logical vbn to facilitate efficiency among the file system and the RAID system 380 when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 660 of the inode (e.g., a second level inode) references an indirect block (e.g., a first level L1 block) that contains 1024 pointers, each of which references a 4 KB data block on disk. For file system data having a size greater than 64 MB, each pointer in the data section 660 of the inode (e.g., a third level L3 inode) references a double-indirect block (e.g., a second level L2 block) that contains 1024 pointers, each referencing an indirect (e.g., a first level L1) block. The indirect block, in turn, contains 1024 pointers, each of which references a 4 KB data block on disk. When accessing a data container (e.g., file or logical unit), each block of the data container may be loaded from disk 130 into the memory 224.

When an on-disk inode (or block) is loaded from disk 130 into memory 224, its corresponding in-core structure embeds the on-disk structure. For example, the dotted line surrounding the inode 600 indicates the in-core representation of the on-disk inode structure. The in-core structure is a block of memory that stores the on-disk structure plus additional information needed to manage data in the memory (but not on disk). The additional information may include, e.g., a "dirty" bit 670. After data in the inode (or block) is updated/modified as instructed by, e.g., a write operation, the modified data is marked "dirty" using the dirty bit 670 so that the inode (block) can be subsequently "flushed" (stored) to disk. The in-core and on-disk format structures of the WAFL file system, including the inodes and inode file, are disclosed and described in the previously incorporated U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 7:
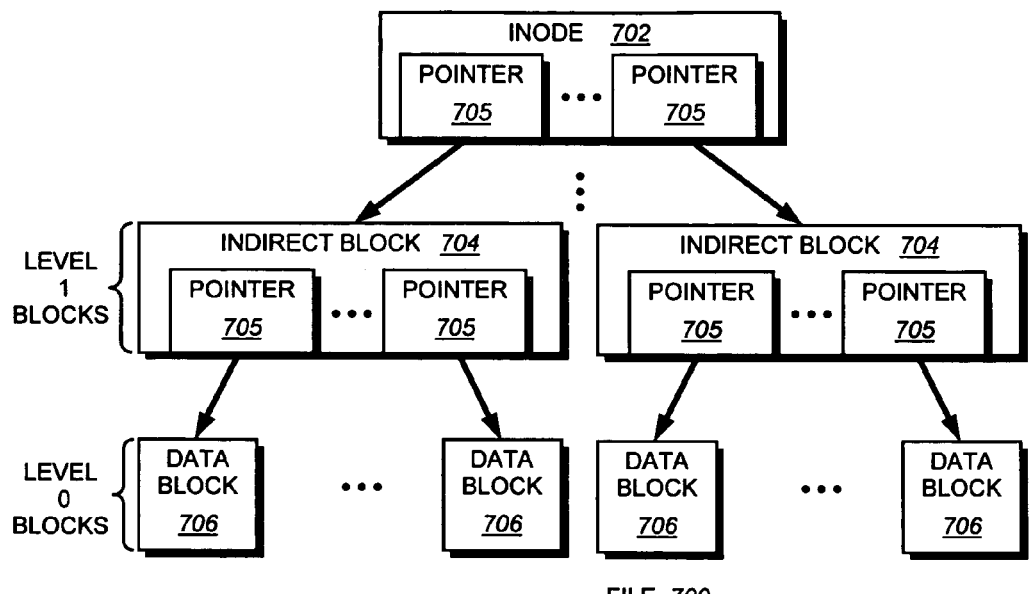
FIG. 7 is a schematic block diagram of an exemplary buffer tree in accordance with an embodiment of the present invention.

FIG. 7 is a schematic block diagram of an embodiment of a buffer tree of a file or logical unit that may be advantageously used with the present invention. The buffer tree is an internal representation of blocks for a data container (e.g., file 700) loaded into the memory 224 and maintained by the write-anywhere file system 360. A root (top-level) inode 702, such as an embedded inode, references indirect (e.g., level 1) blocks 704. Note that there may be additional levels of indirect blocks (e.g., level 2, level 3) depending upon the size of the file. The indirect blocks (and inode) contain pointers 705 that ultimately reference data blocks 706 used to store the actual data of the file. That is, the data of file 700 are contained in data blocks and the locations of these blocks are stored in the indirect blocks of the file. Each level 1 indirect block 704 may contain pointers to as many as 1024 data blocks. According to the "write anywhere" nature of the file system, these blocks may be located anywhere on the disks 130.

A file system layout is provided that apportions an underlying physical volume into one or more virtual volumes (or flexible volume) of a storage system, such as node 200. An example of such a file system layout is described in U.S. patent application Ser. No. 10/836,817 titled EXTENSION OF WRITE ANYWHERE FILE SYSTEM LAYOUT, by John K. Edwards et al. and assigned to Network Appliance, Inc., now issued as U.S. Pat. No. 7,409,494 on Aug. 5, 2008. The underlying physical volume is an aggregate comprising one or more groups of disks, such as RAID groups, of the node. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 700) stored in a flexible volume. This "hybrid" flexible volume embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

Figure 8:
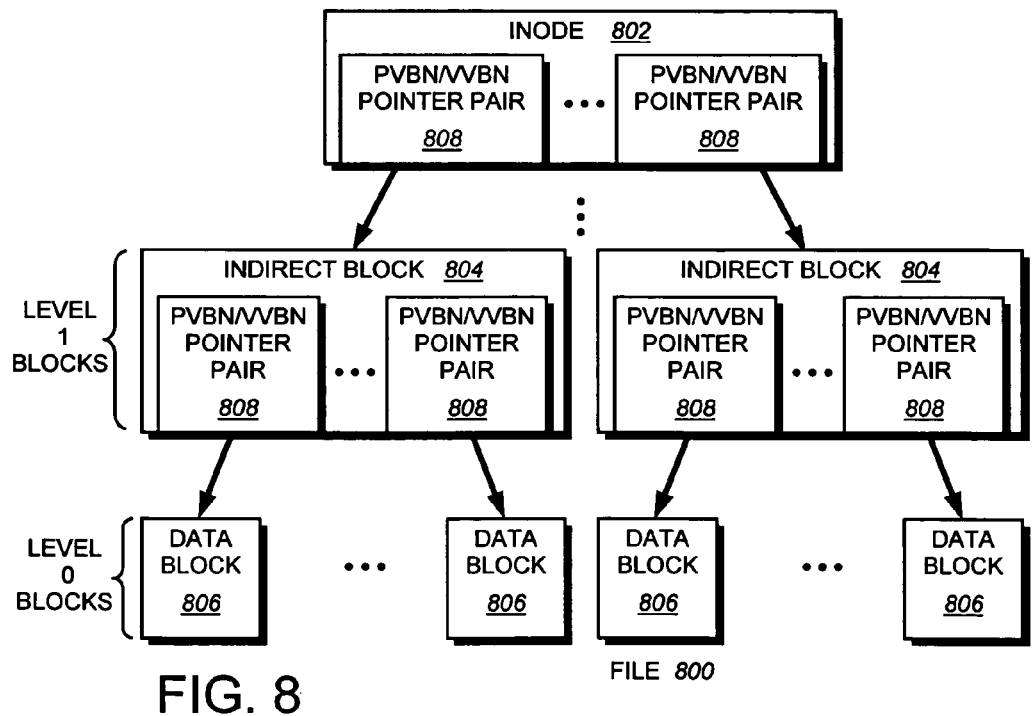
FIG. 8 is a schematic block diagram of an illustrative embodiment of a buffer tree of a file that may be advantageously used with the present invention.

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks. FIG. 8 is a schematic block diagram of an illustrative embodiment of a buffer tree of a file 800 that may be advantageously used with the present invention. A root (top-level) inode 802, such as an embedded inode, references indirect (e.g., level 1) blocks 804. Note that there may be additional levels of indirect blocks (e.g., level 2, level 3) depending upon the size of the file. The indirect blocks (and inode) contain pvbn/vvbn pointer pair structures 808 that ultimately reference data blocks 806 used to store the actual data of the file.

The pvbns reference locations on disks of the aggregate, whereas the vvbns reference locations within files of the flexible volume. The use of pvbns as block pointers 808 in the indirect blocks 804 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 9:
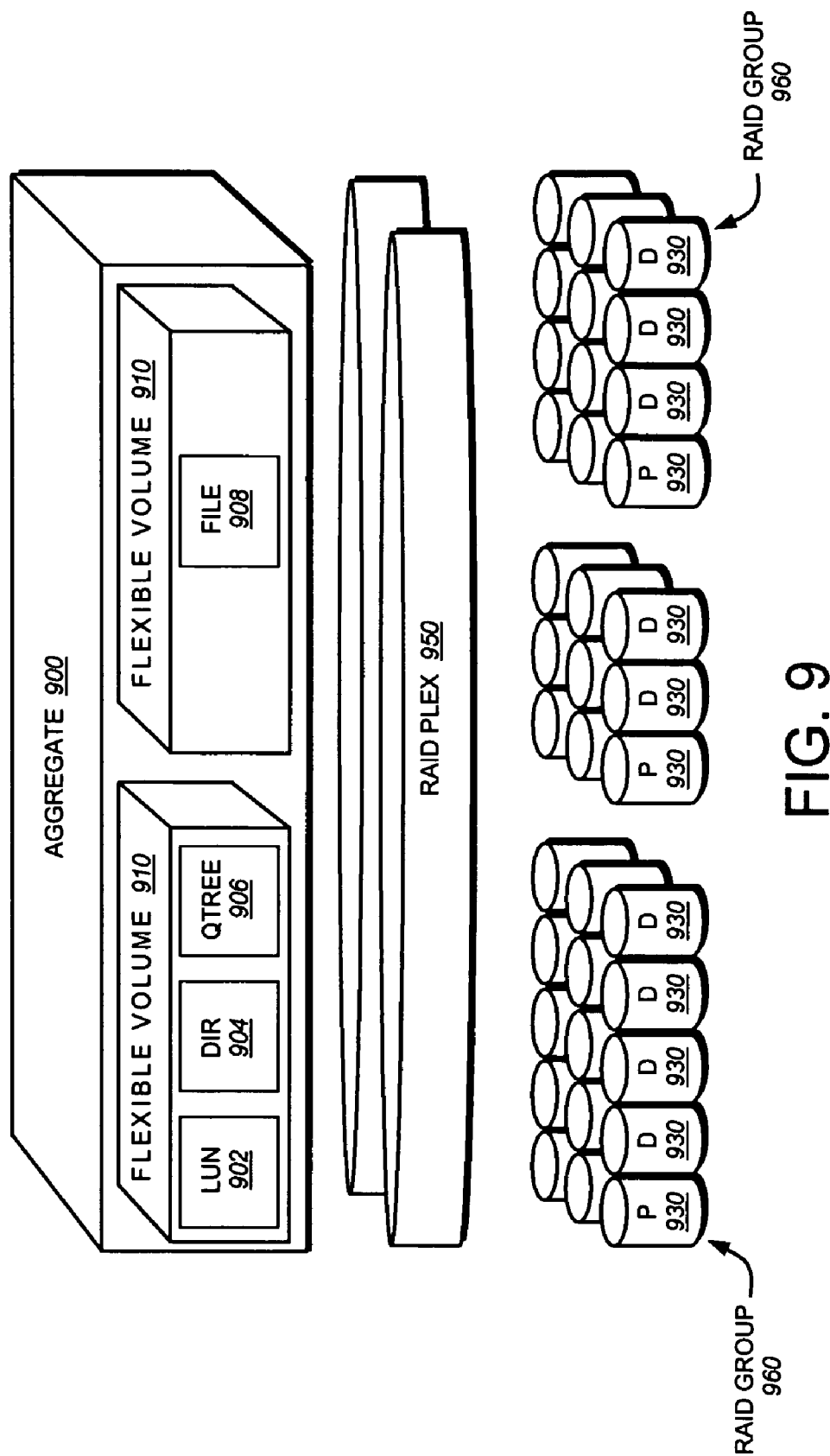
FIG. 9 is a schematic block diagram of an exemplary aggregate in accordance with an embodiment of the present invention.

FIG. 9 is a schematic block diagram of an embodiment of an aggregate 900 that may be advantageously used with the present invention. Luns 902, directories 904, qtrees 906 and files 908 may be contained within flexible volumes 910, such as dual vbn flexible volumes, that, in turn, are contained within the aggregate 900. The aggregate 900 is illustratively layered on top of the RAID system, which is represented by at least one RAID plex 950 (depending upon whether the storage configuration is mirrored), wherein each plex 950 comprises at least one RAID group 960. Each RAID group further comprises a plurality of disks 930, e.g., one or more data (D) disks and at least one (P) parity disk.

Whereas the aggregate 900 is analogous to a physical volume of a conventional storage system, a flexible volume is analogous to a file within that physical volume. That is, the aggregate 900 may include one or more files, wherein each file contains a flexible volume 910 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 910 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 KB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 10:
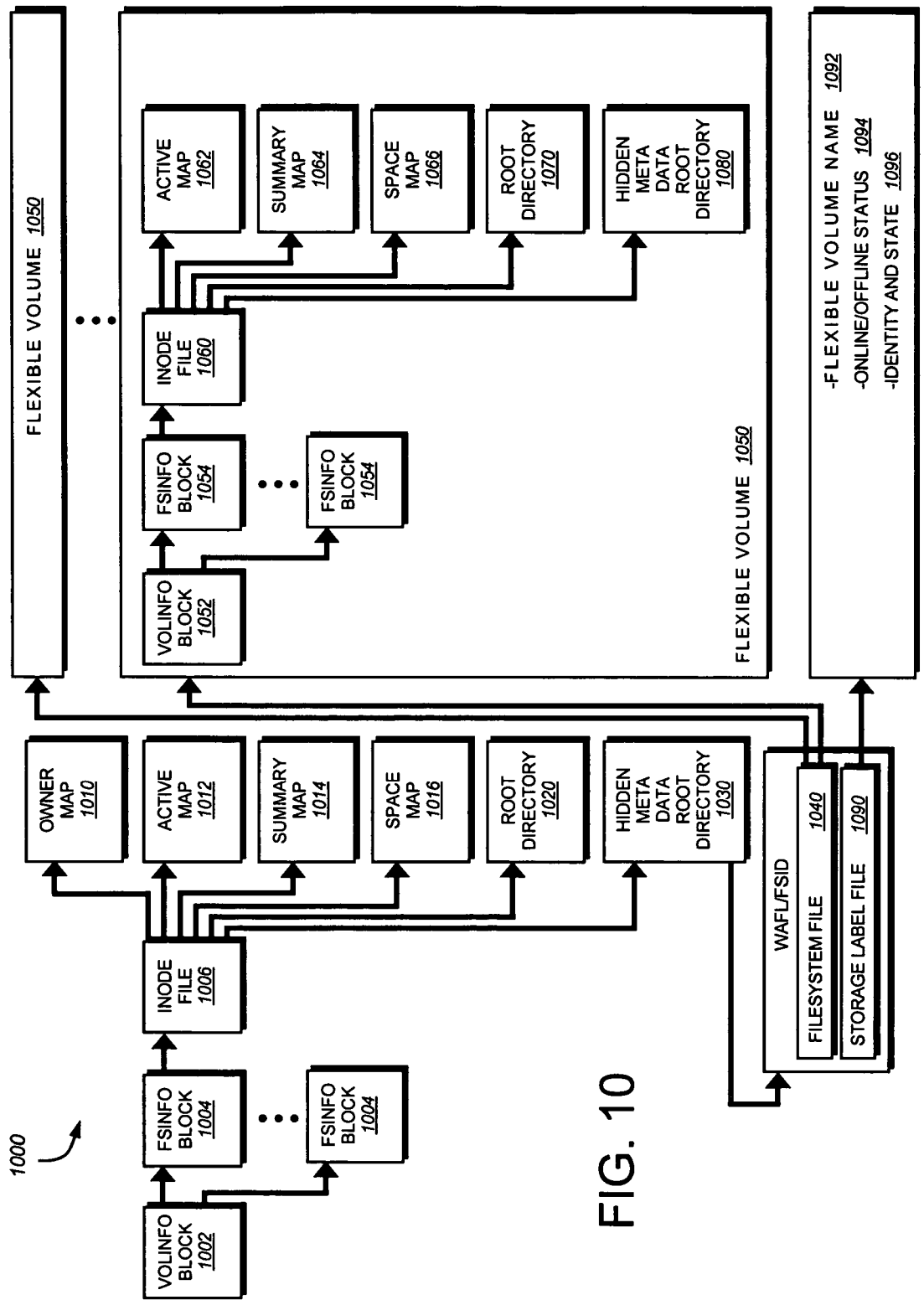
FIG. 10 is a schematic block diagram of an exemplary on-disk layout of the aggregate in accordance with an embodiment of the present invention.

FIG. 10 is a schematic block diagram of an on-disk representation of an aggregate 1000. The storage operating system 300, e.g., the RAID system 380, assembles a physical volume of pvbns to create the aggregate 1000, with pvbns 1 and 2 comprising a "physical" volinfo block 1002 for the aggregate. The volinfo block 1002 contains block pointers to fsinfo blocks 1004, each of which may represent a snapshot of the aggregate. Each fsinfo block 1004 includes a block pointer to an inode file 1006 that contains inodes of a plurality of files, including an owner map 1010, an active map 1012, a summary map 1014 and a space map 1016, as well as other special meta-data files. The inode file 1006 further includes a root directory 1020 and a "hidden" meta-data root directory 1030, the latter of which includes a namespace having files related to a flexible volume in which users cannot "see" the files. The hidden meta-data root directory includes the WAFL/fsid/directory structure that contains filesystem file 1040 and storage label file 1090. Note that root directory 1020 in the aggregate is empty; all files related to the aggregate are organized within the hidden meta-data root directory 1030.

In addition to being embodied as a container file having level 1 blocks organized as a container map, the filesystem file 1040 includes block pointers that reference various file systems embodied as flexible volumes 1050. The aggregate 1000 maintains these flexible volumes 1050 at special reserved inode numbers. Each flexible volume 1050 also has special reserved inode numbers within its flexible volume space that are used for, among other things, the block allocation bitmap structures. As noted, the block allocation bitmap structures, e.g., active map 1062, summary map 1064 and space map 1066, are located in each flexible volume.

Specifically, each flexible volume 1050 has the same inode file structure/content as the aggregate, with the exception that there is no owner map and no WAFL/fsid/filesystem file, storage label file directory structure in a hidden meta-data root directory 1080. To that end, each flexible volume 1050 has a volinfo block 1052 that points to one or more fsinfo blocks 1054, each of which may represent a snapshot, along with the active file system of the flexible volume. Each fsinfo block, in turn, points to an inode file 1060 that, as noted, has the same inode structure/content as the aggregate with the exceptions noted above. Each flexible volume 1050 has its own inode file 1060 and distinct inode space with corresponding inode numbers, as well as its own root (fsid) directory 1070 and subdirectories of files that can be exported separately from other flexible volumes.

The storage label file 1090 contained within the hidden meta-data root directory 1030 of the aggregate is a small file that functions as an analog to a conventional raid label. A raid label includes physical information about the storage system, such as the volume name; that information is loaded into the storage label file 1090. Illustratively, the storage label file 1090 includes the name 1092 of the associated flexible volume 1050, the online/offline status 1094 of the flexible volume, and other identity and state information 1096 of the associated flexible volume (whether it is in the process of being created or destroyed).

It should be noted that while this description is written in terms of aggregates and flexible volumes, the teachings of the present invention may be utilized with storage operating systems having any data format. As such, the description of aggregates and flexible volumes should be taken as exemplary only.

F. VLDB

Figure 11:
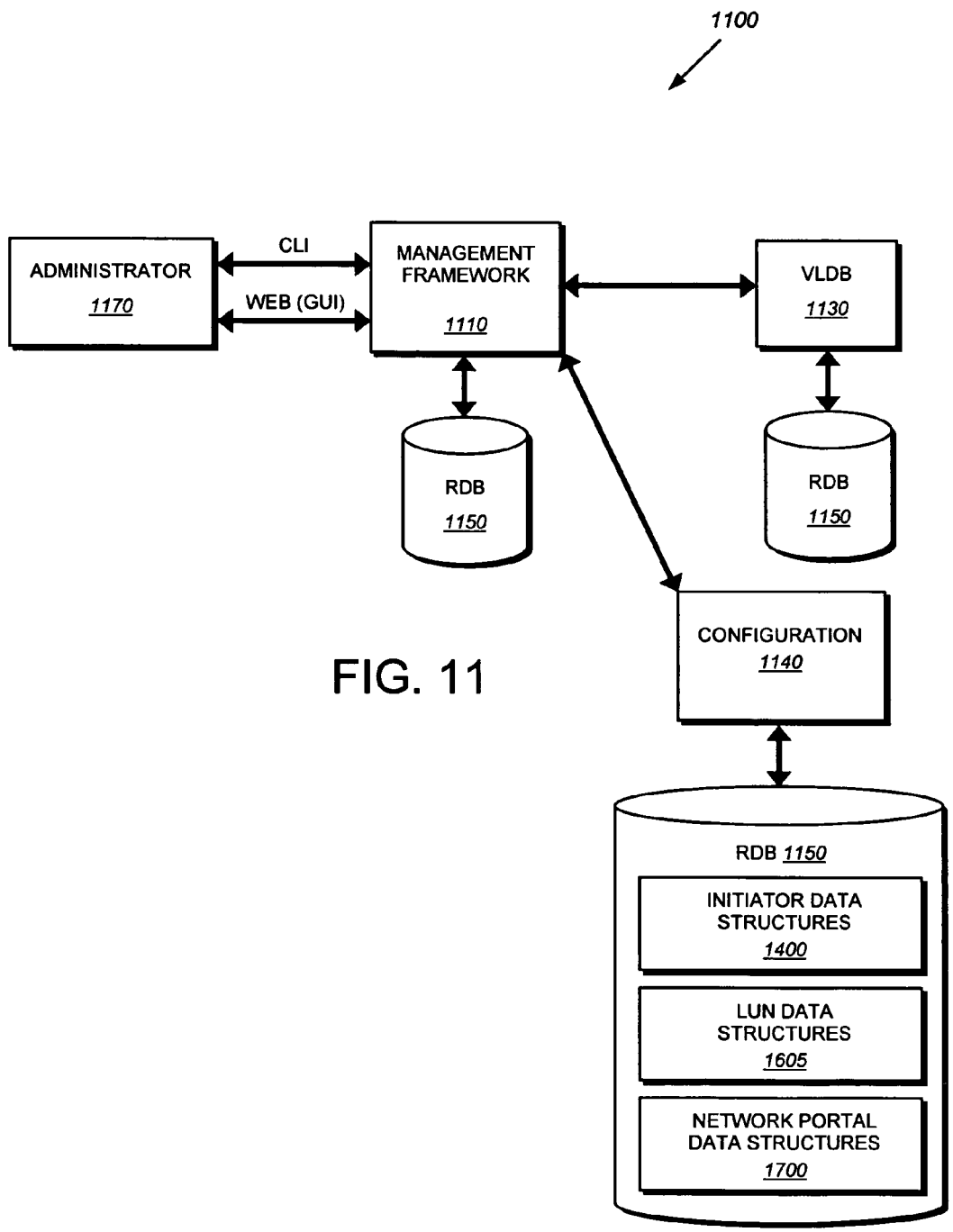
FIG. 11 is a schematic block diagram illustrating a collection of management processes in accordance with an embodiment of the present invention.

FIG. 11 is a schematic block diagram illustrating a collection of management processes that execute as user mode applications 1100 on the storage operating system 300 to provide management of configuration information (i.e. management data) for the nodes of the cluster. To that end, the management processes include a management framework process 1110, a configuration module 1140 and a volume location database (VLDB) process 1130, each utilizing a data replication service (RDB 1150) linked as a library. The management framework 1110 provides to an administrator 1170 a user interface via a command line interface (CLI) and/or a web-based graphical user interface (GUI).

These applications 1100 illustratively operate in user mode to enable reconfiguration or re-initialization of any of the applications without requiring the complete re-initialization of the storage operating system, which would result in a loss of data access for some length of time while the storage operating system initializes. However, it should be noted that in alternate embodiments, the management process/applications 1100 may execute in non-user mode, e.g., in kernel mode.

The management framework is illustratively based on a conventional common interface model (CIM) object manager that provides the entity to which users/system administrators interact with a node 200 in order to manage the cluster 100. The management framework 1110 implements various commands for configuring luns exported by the cluster. In accordance with the illustrative embodiment of the present invention, the management framework 1110 manages the configuration and distribution of lun configuration information, such as initiator data structures and/or lun data structures, described further below.

The VLDB 1130 is a database process that tracks the locations of various storage components (e.g., flexible volumes, aggregates, etc.) within the cluster 100 to thereby facilitate routing of requests throughout the cluster. In the illustrative embodiment, the N-module 310 of each node accesses a configuration table 235 that maps the volume ID 502 of a data container handle 500 to a D-module 350 that "owns" (services) the data container within the cluster. The VLDB includes a plurality of entries which, in turn, provide the contents of entries in the configuration table 235; among other things, these VLDB entries keep track of the locations of the flexible volumes (hereinafter generally "volumes 910") and aggregates 900 within the cluster. Examples of such VLDB entries include a VLDB volume entry 1200 and a VLDB aggregate entry 1300.

The configuration module 1140 implements lun configuration and management features to enable an administrator 1170 to manage the luns provides by the cluster. Specifically, the configuration module 1140 implements commands for establishing network portals on a storage system and for tracking the status of network portals in conjunction with the M-module. For each network portal on a N-module, there is a network portal data structure 1700, described further below that is utilized for tracking various data related to the network portal.

Figure 12:
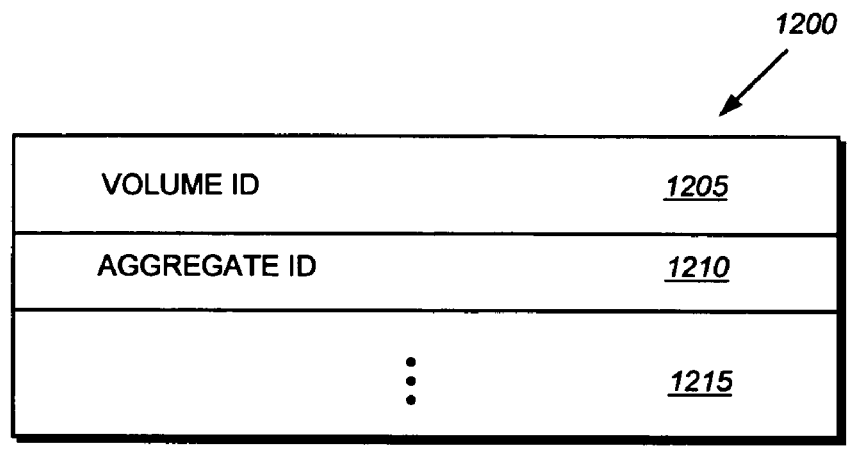
FIG. 12 is a schematic block diagram of a volume location database (VLDB) volume entry in accordance with an embodiment of the present invention.
Figure 13:
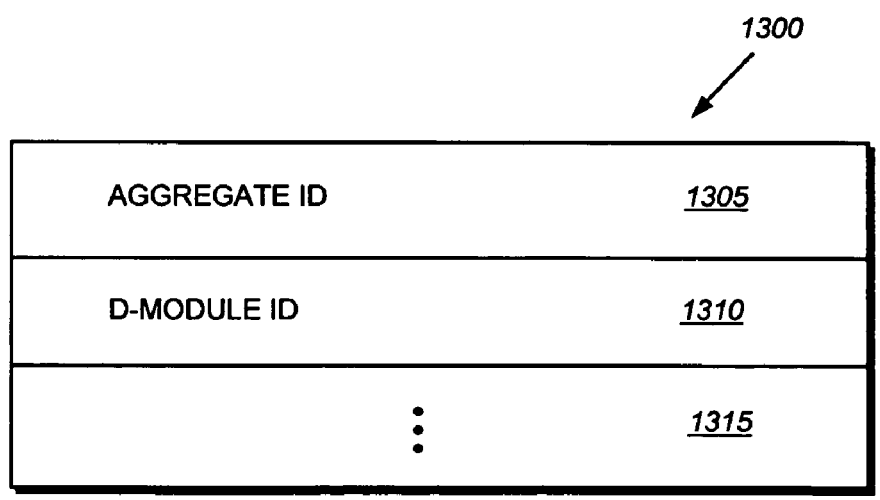
FIG. 13 is a schematic block diagram of a VLDB aggregate entry in accordance with an embodiment of the present invention.

FIG. 12 is a schematic block diagram of an exemplary VLDB volume entry 1200. The entry 1200 includes a volume ID field 1205, an aggregate ID field 1210 and, in alternate embodiments, additional fields 1215. The volume ID field 1205 contains an ID that identifies a volume 910 used in a volume location process. The aggregate ID field 1210 identifies the aggregate 900 containing the volume identified by the volume ID field 1205. Likewise, FIG. 13 is a schematic block diagram of an exemplary VLDB aggregate entry 1300. The entry 1300 includes an aggregate ID field 1305, a D-module ID field 1310 and, in alternate embodiments, additional fields 1315. The aggregate ID field 1305 contains an ID of a particular aggregate 900 in the cluster 100. The D-module ID field 1310 contains an ID of the D-module hosting the particular aggregate identified by the aggregate ID field 1305.

The VLDB illustratively implements a RPC interface, e.g., a Sun RPC interface, which allows the N-module 310 to query the VLDB 1130. When encountering contents of a data container handle 500 that are not stored in its configuration table, the N-module sends an RPC to the VLDB process. In response, the VLDB 1130 returns to the N-module the appropriate mapping information, including an ID of the D-module that owns the data container. The N-module caches the information in its configuration table 235 and uses the D-module ID to forward the incoming request to the appropriate data container. All functions and interactions between the N-module 310 and D-module 350 are coordinated on a cluster-wide basis through the collection of management processes and the RDB library user mode applications 1100.

To that end, the management processes have interfaces to (are closely coupled to) RDB 1150. The RDB comprises a library that provides a persistent object store (storing of objects) for the management data processed by the management processes, such as data stored in data structures 1400, 1605 and 1700. Notably, the RDB 1150 replicates and synchronizes the management data object store access across all nodes 200 of the cluster 100 to thereby ensure that the RDB database image is identical on all of the nodes 200. In the illustrative embodiment, the RDB is implemented as a distributed facility so that each node maintains a local copy of the data contained within the RDB. However, in alternate embodiments, the functionality of the RDB may be implemented in a non-distributed facility. For example, the M-module 170 may maintain a central database that must be queried by each N/D-module that desires access. Alternately, a single element (N/D-module) may be selected to maintain the RDB, with each other element (N/D-module) querying the identified element for access. The use of a distributed facility improves performance, but other techniques for enabling N/D-modules to have access to RDB's information may be utilized within the teachings of the present invention.

At system startup, each node 200 records the status/state of its interfaces and IP addresses (those IP addresses it "owns") into the RDB database. Additionally, should an IP address ever be moved from one N-module to another, such modifications are stored within the RDB so that all elements of the cluster are able to determine the current cluster configuration. IP addresses may be moved from one N-module to another for a variety of reasons. An N-module may fail, which would result in an automatic failover of its IP addresses to other N-modules within the cluster. Alternately, an administrator may manually move and/or reassign IP addresses to, e.g., load balance, etc.

G. Lun Configuration

Figure 14:
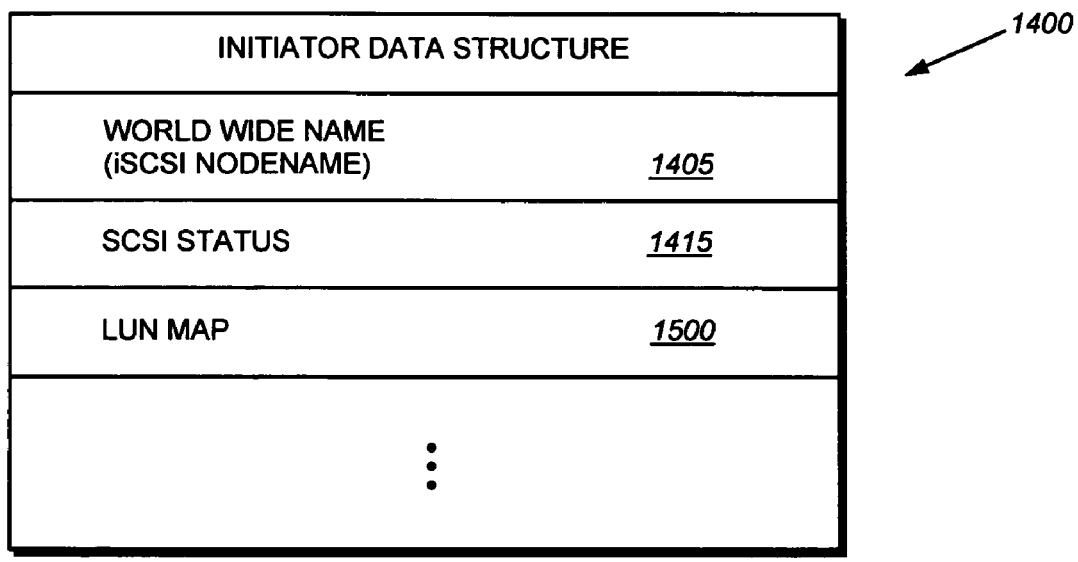
FIG. 14 is a schematic block diagram of an initiator data structure in accordance with an embodiment of the present invention.

As noted above, the SCSI target module 335 illustratively generates and maintains a set of initiator data structures 1400 as shown in FIG. 14 and, in the illustrative embodiment, is created when an initiator first connects to (e.g., establishes a session with) an N-module. Each initiator data structure is associated with a SCSI initiator (i.e., a client of the cluster). The SCSI target module 335 of the N-module illustratively populates the various fields with data obtained during the connection stage or from an initiator data structure retrieved from the RDB (and loaded in memory 224) as described further below. The initiator data structure 1400 includes various fields including, e.g., a world wide name (iSCSI Nodename) field 1405, a SCSI status field 1415 and a lun map 1500. It should be noted that in alternate embodiments the initiator data structure 1400 may have varying and/or differing fields from the illustrative embodiment. The world wide name field 1405 contains a unique name (e.g., iSCSI nodename) associated with the initiator. The SCSI status field 1415 contains various status information concerning the initiator's SCSI connection. The lun map 1500 contains a mapping of virtual luns (VLUNs) to physical lun (PLUNs). In the illustrative embodiment, the lun map 1500 is generated along with the initiator data structure 1400 when a client initially logs into the storage system if an initiator data structure is not available from the RDB. The initiator data structures are illustratively distributed by the RDB to all N-modules within the cluster so that modifications may be seen by those modules. The RDB alerts each N-module of a change to the data structures, which causes the N-module to retrieve the changed information from the RDB and update its local configuration. Illustratively, once an N-module (or D-module) updates its local copy of the RDB, the RDB mechanism informs each other instantiation of RDB within the cluster to retrieve the updated information. It should be noted that in other embodiments, any distributed database implementation may be utilized with the RDB. As such, the implementation described herein should be taken as exemplary only.

Figure 15:
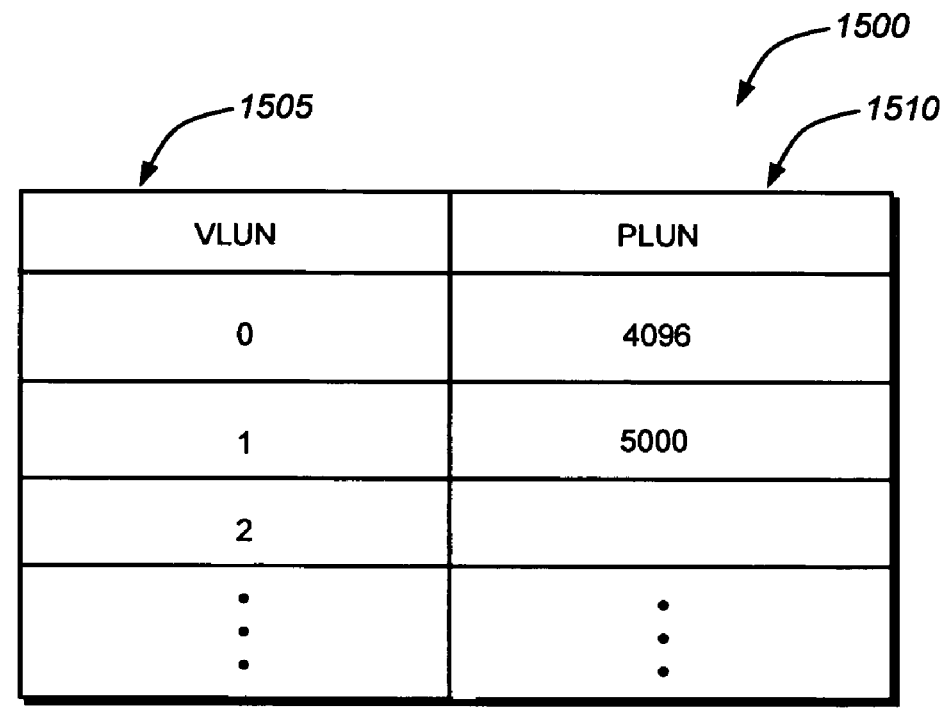

An exemplary lun map 1500, shown in FIG. 15, maps VLUNs to PLUNs. A VLUN is a lun returned to a SCSI initiator in a storage system environment. An initiator may be assigned a set of VLUNs starting from zero and progressing up to the number of luns to which the initiator is connected. Conversely, a PLUN is an actual lun associated with a vdisk managed by the storage system. As an intermediary between clients (initiators) and vdisks (luns), the storage system typically manages a larger set of luns than the set that is visible to an initiator.

The N-module utilizes the LUN map 1500 to translate a VLUN from a SCSI initiator to the appropriate PLUN. The lun map 1500 has, in the exemplary embodiment, two columns. The first column, VLUN 1505 identifies the virtual logical unit number (VLUN) that a SCSI initiator may access. In one embodiment of the present invention, each SCSI initiator attached to the cluster has its own lun address space. The second column comprises of physical logical unit numbers (PLUNs) 1510 that are mapped to corresponding VLUNs 1505. Thus, in the example shown in FIG. 15, VLUN 0 is mapped to PLUN 4096. Similarly VLUN 1 is mapped to PLUN 5000. The use of VLUN to PLUN mapping enables each SCSI initiator to address a specific device with an initiator-specific lun value, i.e. a VLUN. If a lun value is not exported to a client, the PLUN value associated with the VLUN entry in the lun map 1500 is empty. For example, VLUN 2 is not mapped to any PLUN value. Thus, any data access request issued by the client and directed to VLUN 2 will result in an error.

Figure 16:
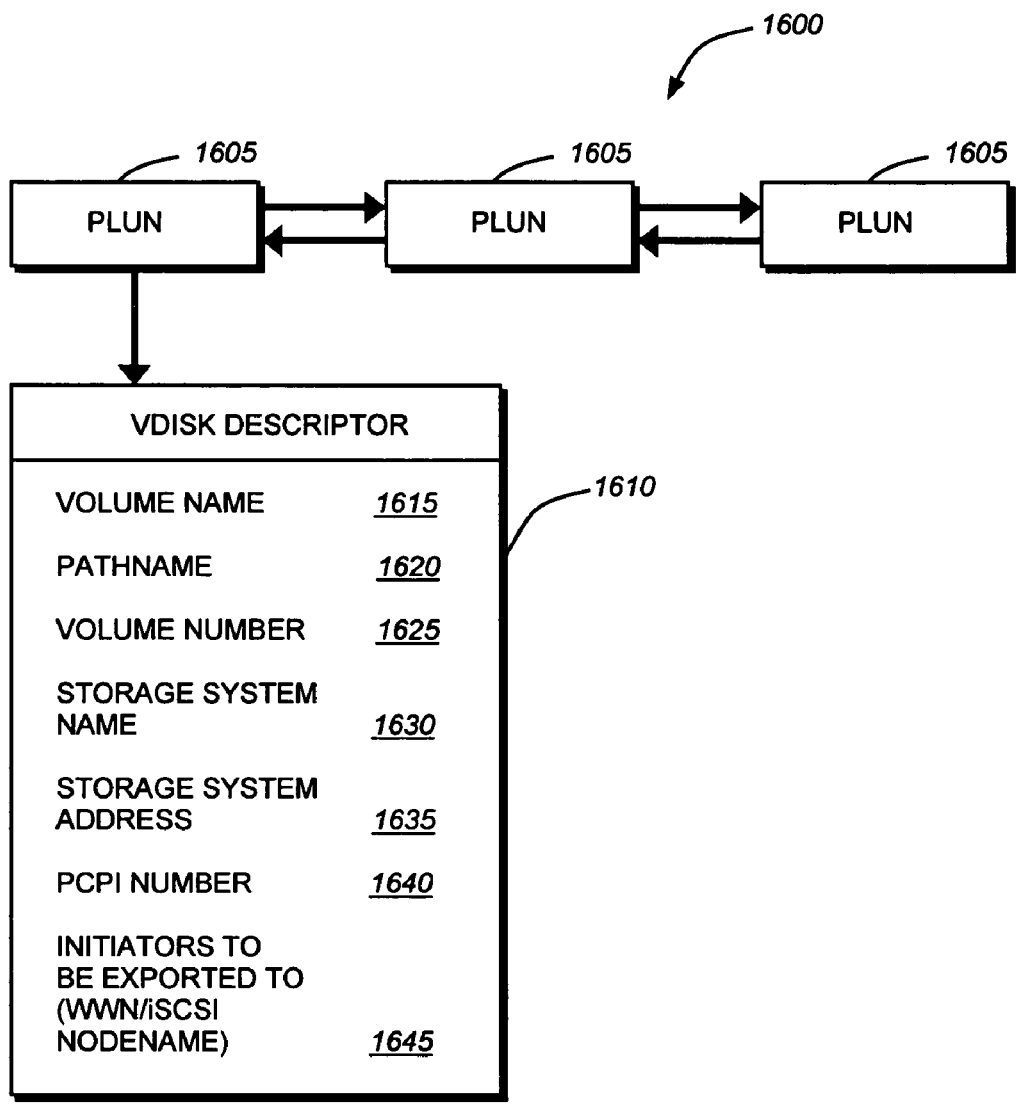
FIG. 16 is a schematic block diagram of a vdisk descriptor in accordance with an embodiment of the present invention.

FIG. 16 illustrates an exemplary set 1600 of linked lun data structures ("objects") 1605 maintained by the SCSI target module 335. Each lun data descriptor object 1605 contains various information associated with a vdisk embodied as a PLUN. This information is used by the cluster to manage the vdisk. Each PLUN data descriptor object 1605 also, illustratively, includes a vdisk descriptor 1610.

Each vdisk (lun) managed by the cluster has an associated vdisk descriptor 1610 that includes various data fields for information pertaining to the vdisk. These fields include volume name 1615, path name 1620, volume number 1625, storage system name 1630, storage system address 1635, PCPI number 1640 and a list of initiators (e.g. iSCSI nodenames) 1645 to which the lun is to be exported. It should be noted that the fields described herein are exemplary only in that additional and/or differing fields may be utilized in accordance with various embodiments of the invention. For example, the volume name field 1615 identifies the volume containing the vdisk. The path name field 1620 describes a path on the volume identified in the volume name field 1615 to the file containing the vdisk. Thus if the storage system name stored in field 1630 is "System5", the volume name stored in field 1615 is "vol0" and the path name stored in field 1620 field is "/vdisks/vdisk," then the vdisk identified by vdisk descriptor 1610 may be uniquely identified by the fully qualified path "System5:/vol0/vdisks/vdisk." The list of WWNs 1645 stores the WWNs and/or iSCSI names of clients (initiators) to which the lun is to be exported and that may access the lun. The list of WWNs 1645 may be set by an administrator when the vdisk is initially created.

By enabling each N-module of a cluster to have access to initiator data structure 1400 and lun data structures 1605, each N-module may function as a front end to the cluster and serve data access requests directed to any lun serviced by the cluster. Thus, in the event of a failover operation, once the appropriate network portals have been assumed by a surviving N-module, the surviving N-module may process any data access requests directed to the assumed network portals.

H. Target Portal Group Failover

The present invention is directed to a system and method for configuring a cluster of interconnected storage systems to permit iSCSI TPG failover. As noted, each storage system of the cluster comprises one or more network elements (N-module) and disk elements (D-module) operatively interconnected by a cluster switching fabric. The present invention permits the cluster to be presented to an initiator (client) as a unified iSCSI target by encoding each N-module to function as one of a plurality of "front ends" of the iSCSI target. As a front end, any N-module may cooperate with clients to open (establish) one or more iSCSI sessions and thereafter receive data access requests directed to the unified iSCSI target. A data access request received by an N-module is forwarded from that module to an appropriate D-module of the cluster for processing.

Also, as noted, the M-module 170 is operatively interconnected with the cluster to provide a set of UI tools that enable an administrator to manage network portals. The RDB 1150 executes as a user application on each storage system and interfaces with configuration process 1140 to centralize configuration of luns within the cluster. Modifications to the network portal configuration are stored within the RDB. The RDB alerts each N-module of a change, which causes the N-module to retrieve the changed information from the RDB and update its local configuration.

Furthermore, the M-module includes failover monitor 175 that works to ensure that lun configurations, including intended failover destinations, are configured so that all network portals belonging to the same TPG fail over to the same N-module. Should the administrator attempt to configure failover destinations so that one or more network portals within the TPG failover to different N-modules, the failover monitor 175 detects such misconfiguration and generates an error message and alerts (notifies) the administrator of the incompatible configuration. However, if the configuration is acceptable, the appropriate network portal data structures 1700 are updated and stored in the RDB 1150 so that they are accessible to all N-modules of the cluster.

When a failure condition occurs, e.g., a N-module suffers an error condition, the M-module (or failover monitor 175 therein) detects the failure condition and alerts the surviving N-modules, i.e., those N-modules that have not suffered an error condition, of the failure. The surviving N-modules access the RDB to determine whether they are to assume the identities of any network portals of the failed N-modules by e.g., examining the network portal data structure 1700. Upon determining that an N-module is the failover destination for one or more network portals, the N-module assumes the identities of all network portals within the TPG. Once the identities of the network portals have been assumed, the N-module begins processing data access requests directed to the network portals of the TPG.

Figure 17:
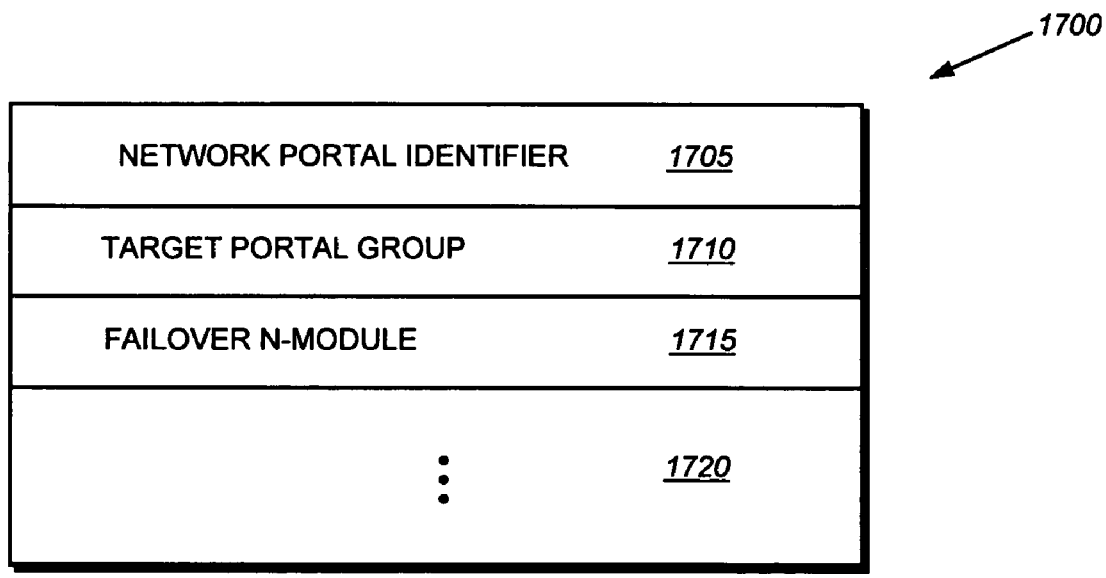
FIG. 17 is a schematic block diagram of an exemplary network portal data structure in accordance with an embodiment of the present invention.

FIG. 17 is a schematic block diagram of an exemplary network portal data structure 1700 in accordance with an embodiment of the present invention. The network portal data structure 1700 includes a network portal identifier field 1705, a target portal group field 1710, a failover N-module field 1715 and, in alternate embodiments, additional fields 1720. The network portal identifier field 1705 contains an identifier of the network portal. In the illustrative embodiment, this ID may comprise a TCP port number and IP address. However, in alternate embodiments, this may be another identifier that uniquely identifies a network portal. The target portal group field 1710 identifies with which TPG this network portal is associated. Illustratively, the TPG is identified by a numeric target portal tag associated with the TPG as described in the conventional iSCSI specification. The failover network module field 1715 identifies which N-module is to assume control of the network portal in the event of a failover occurrence.

Figure 18:
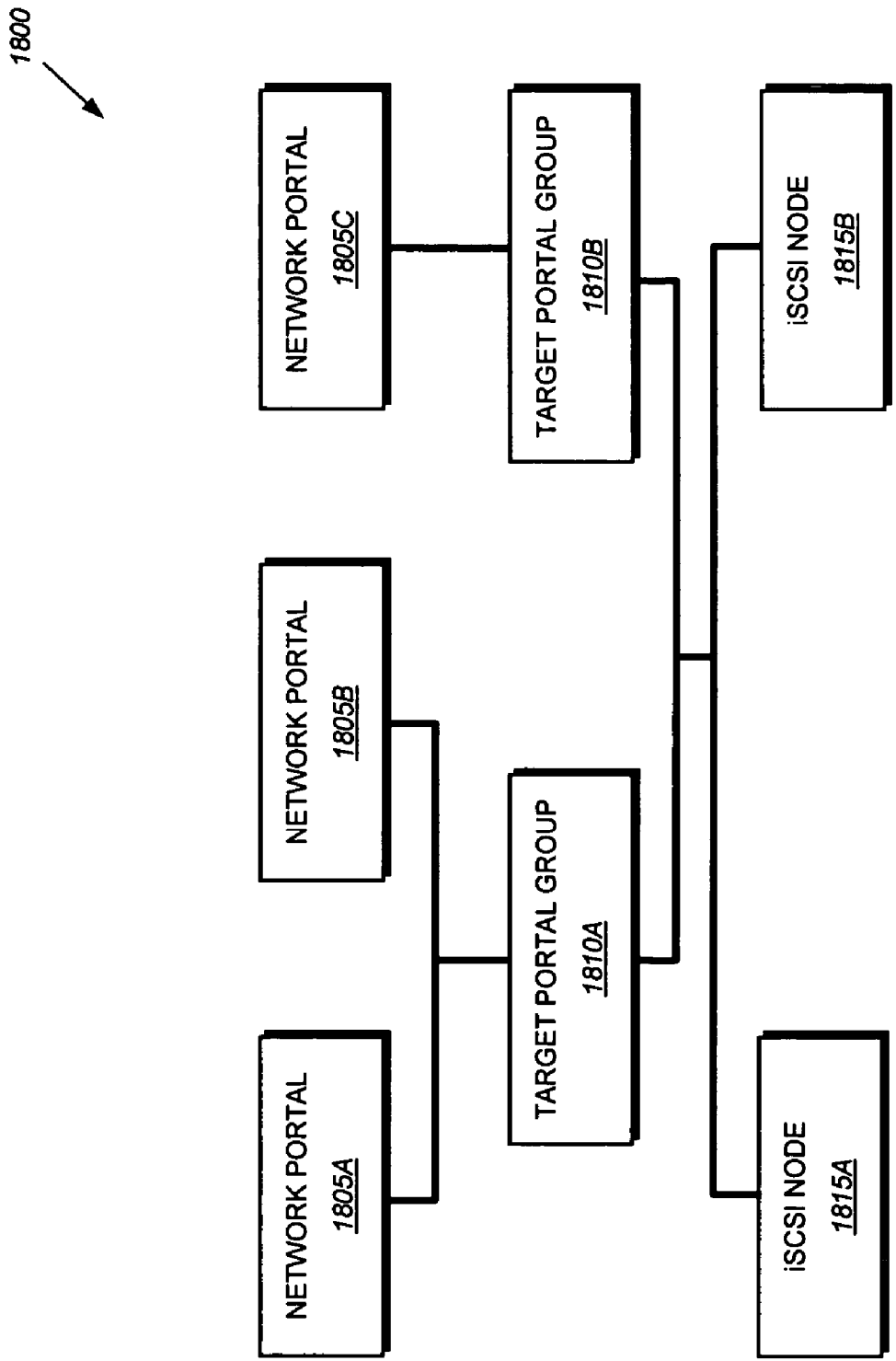
FIG. 18 is a diagram showing the relationship between network portals, target portal groups and iSCSI nodes in accordance with an embodiment of the present invention.

FIG. 18 is a highly schematic block diagram of an exemplary network entity 1800 in accordance with an embodiment of the present invention. A plurality of network portals 1805A, B, C are associated with one or more target portal groups 1810 A, B. The network portals 1805 illustratively comprise an IP address and TCP port number from which the network entity 1800 makes available iSCSI services. Illustratively, network portals 1805A, B are associated with target portal group 1810A. Similarly, network portal 1805C is associated with target portal group 1810B. The target portal groups 1810 interface with one or more unified iSCSI target nodes 1815A, B. The network entity 1800, which is illustratively an iSCSI target, is defined as a device which is accessible from an IP network. In the illustrative embodiment, the network entity 1800 may comprise cluster 100 with iSCSI nodes 1815 may comprise D-modules 350 and the network portals 1805 may comprise N-modules 310.

Network portals are illustratively arranged into target portal groups for a variety of reasons. The ISCSI protocol specifies that an iSCSI session may utilize multiple connections but that all connections must use network portals within the same target portal group. Thus, for example, an opened session utilizing a first connection to network portal 1805A may also open a second connection to network portal 1805B, which is within the same target portal group 1810A, and both connections may be utilized within the same iSCSI session.

Figure 19:
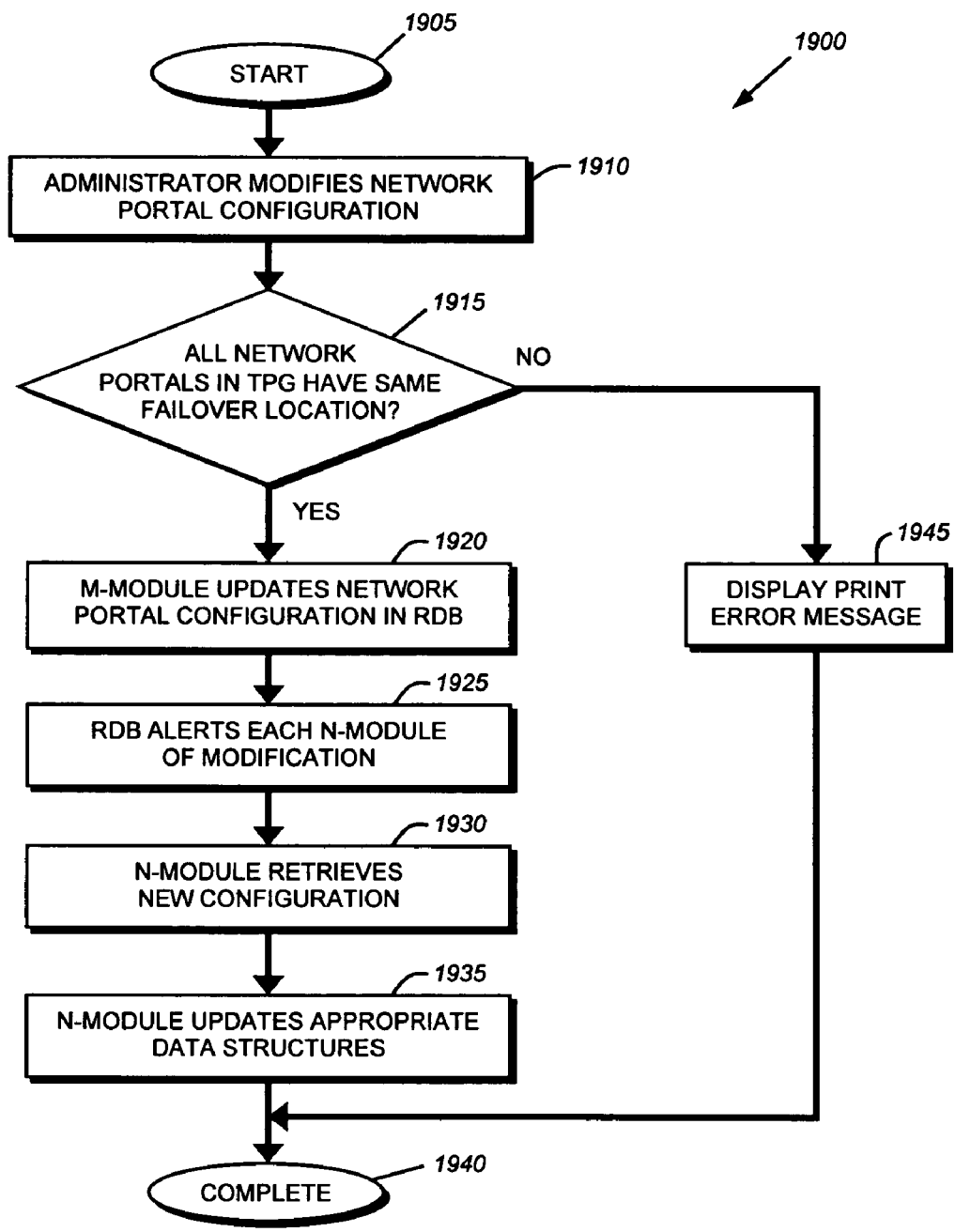
FIG. 19 is a flowchart detailing the steps of a procedure for updating network portal configuration in accordance with an embodiment of the present invention.

FIG. 19 is a flowchart detailing the steps of a procedure 1900 for updating network portal configuration information in accordance with an embodiment the present invention. The procedure 1900 begins in step 1905 and continues to step 1910 where an administrator modifies the network portal configuration. The network portal configuration modification may include, e.g., modifying a failover destination for a network portal, etc. In step 1915, the M-module then determines whether all network portals within a TPG have the same failover location. This determination may be performed, for example, by examining all network portal data structures 1700. In response to determining that all network portals within a TPG have the same failover location, the M-module updates the network portal configuration stored within the RDB in step 1920. The RDB alerts each N-module of the modification to the network portal configuration in step 1925. This alert may be accomplished using, for example a RPC or other form of inter-process communication. In response, an N-module retrieves the new configuration from the RDB in step 1930. The N-module updates the appropriate data configuration, i.e., appropriate network portal data structures, in step 1935. The procedure then completes in step 1940. Thus, the RDB illustratively utilizes a push technique for distributing changes to the network portal configuration to each N-module. As noted above, other techniques, including, e.g., pull techniques may be utilized for distributing changes to each N-module.

However, if in step 1915 it is determined that not all network portals within a TPG have the same failover location, the procedure 1900 branches to step 1945 and displays an error message to alert the administrator that the modified configuration will not guarantee proper TPG failover before completing in step 1940. In alternate embodiments, the M-module may take additional and/or differing action.

Figure 20:
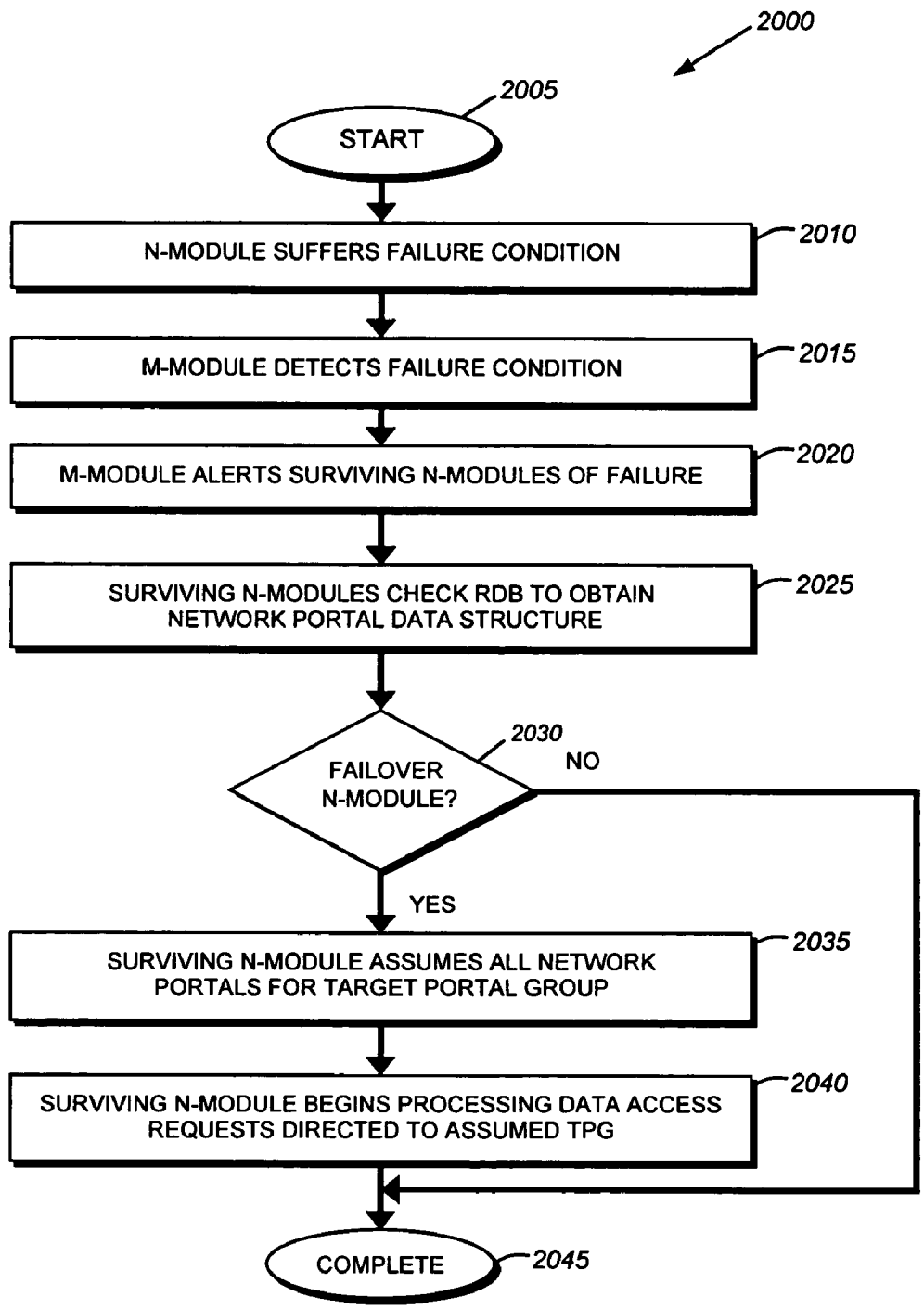
FIG. 20 is a flowchart detailing the steps of a procedure for performing a failover operation in accordance with an embodiment of the present invention.

FIG. 20 is a flowchart detailing the steps of a procedure 2000 for performing a failover operation in accordance with an embodiment of the present invention. The procedure 2000 begins in step 2005 and continues to step 2010 where a N-module suffers a failure condition. This failover condition may be, e.g., a power loss, loss of network connectivity, software crash, etc. In step 2015, the M-module detects the failure condition by, for example, monitoring a heart beat from the N-module or using any other conventional failure detection mechanism. Alternately, steps 2010 and 2015 may be replaced by an administrator initiating a takeover operation for example, when maintenance must be performed to a particular N-module. In response, the M-module alerts the surviving N-modules of the failure/takeover in step 2020. This may be performed by, for example, sending a RPC message to each surviving N-module. The surviving N-module(s) then access the RDB in step 2025 to obtain copies of network portal data structures to determine if any of them are selected as the failover destination for one or more network portals. If so, the selected N-module then assumes the identity of all network portals for the appropriate TPG in step 2035, otherwise the process completes in step 2045. The selected N-module may retrieve information relating to initiators, and/ or luns from initiator data structure and lun data structures stored in RDB. The selected N-module then begins processing data access requests directed to the network portals within the assumed TPG in step 2040. The procedure 2000 then completes in step 2045.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-modules, the teachings of the present invention are equally suitable to systems where the functionality of the N and D-modules are implemented in a single system. Alternately, the functions of the N and D-modules may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for failover of one or more network portals, comprising:
  detecting a failure condition of a storage system;
  alerting a surviving storage systems of the detected failure;
  obtaining a network portal data structure, wherein the network portal data structure identifies which target portal group is associated with a plurality of network portals;
  ensuring that each network portal is to be assumed by the surviving storage system; and
  in response to ensuring that each network portal is to be assumed by the surviving storage system, assuming one or more identities of each network portal by the surviving storage system, wherein the identities of all network portals within the target portal group are assumed by the surviving storage system.

2. The method of claim 1 wherein obtaining the network portal data structure further comprises retrieving the network portal data structure from a replicated database.

3. The method of claim 1 wherein the storage systems comprise network elements.

4. The method of claim 1 wherein each network portal comprises a network address and a port number.

5. The method of claim 4 wherein the network address comprises an Internet Protocol address.

6. The method of claim 4 wherein the port number comprises a Transport Control Protocol Port number.

7. The method of claim 1 further comprising processing data access requests directed to the assumed network portals by the surviving storage system.

8. The method of claim 1 wherein assuming the identities of each network portal by the surviving storage system further comprises assigning each network portal to one or more network adapters associated with the surviving storage system.

9. A system for failover of one or more network portals, comprising:
  a storage system configured with a processor and a memory;
  means for detecting a failure condition of the storage system;
  means for alerting a surviving storage system of the detected failure, wherein each surviving storage system is configured with a processor and a memory;

means for obtaining a network portal data structure, wherein the network portal data structure identifies which target portal group is associated with a plurality of network portals;

means for ensuring that each network portal is to be assumed by the surviving storage system; and in response to ensuring that each network portal is to be assumed by the surviving storage system, means for assuming one or more identities of each network portal by the surviving storage system, wherein the identities of all network portals within the target portal group are assumed by the surviving storage systems.

10. The system of claim 9 wherein the means for obtaining the network portal data structure comprises means for retrieving the network portal data structure from a replicated database.

11. The system of claim 9 wherein the storage systems comprise network elements.

12. The system of claim 9 wherein each network portal comprises of a network address and a port number.

13. The system of claim 12 wherein the network address comprises an Internet Protocol address.

14. The system of claim 12 wherein the port number comprises a Transport Control Protocol Port number.

15. The system of claim 9 further comprising means for processing data access requests directed to the assumed network portals by the surviving storage system.

16. The system of claim 9 wherein the means for assuming the identities of each network portal by the surviving storage system further comprises means for assigning each network portal to one or more network adapters associated with the surviving storage system.

17. A computer readable storage medium containing executable program instructions executed by a processor, comprising:

program instructions that detect a failure condition of a storage system;

program instructions that alert a surviving storage system of the detected failure;

program instructions that obtain a network portal data structure, wherein the network portal data structure identifies which target portal group is associated with a plurality of network portals;

program instructions that ensure that each network portal is to be assumed by the surviving storage system; and program instructions that assume one or more identities of each network portal by the surviving storage system, wherein the identities of all network portals within the target portal group are assumed by the surviving storage system, in response to ensuring that each network portal is to be assumed by the surviving storage system.

18. A system for failover of one or more network portals, comprising:

a processor configured to execute a management module, the management module operatively interconnected with one or more elements of a cluster, the management module configured to verify that a configuration of the one or more network portals associated with a target portal group failover to a same network element module.

19. The system of claim 18 wherein the management module is further configured to detect a failure of one of the network elements and further configured to alert one or more surviving network elements of the network element failure.

20. The system of claim 19 wherein in response to being alerted of the network element failure, each surviving network element is configured to obtain one or more network portal data structures and determine if one or more network portals associated with the one or more network portal data structures are assumed by a single surviving network element of the one or more surviving network elements.

21. A system, comprising:

a plurality of nodes operatively interconnected through a cluster switching fabric to form a cluster, wherein each node comprises at least one network element module and at least one storage device element module; and a processor configured to execute a management module, the management module operatively interconnected with one or more network elements of the cluster, the management module configured to verify that a configuration of all network portals associated with a target portal group failover to a same network element module, wherein a network portal data structure identifies which network element modules are associated with the target portal group.

22. A method for failover of one or more network portals, comprising:

interconnecting a plurality of nodes through a cluster switching fabric to form a cluster, wherein each node comprises at least one network element module and at least one storage device element module;

detecting a failure condition of a first network element module;

alerting one or more surviving network element modules of the detected failure;

obtaining one or more network portal data structures by at least one of the surviving network element modules, wherein each network portal data structure identifies which target portal group is associated with each network portal;

determining if one or more network portals are to be assumed by one of the one or more surviving network element modules;

in response to determining that one or more network portals are to be assumed by a single surviving network element modules, assuming one or more identities of the one or more network portals by the single surviving network element module, wherein the identities of all network portals within a single target portal group are assumed by the single surviving network element module; and receiving a request, by the single surviving network element, directed to one of the network portals within the single target portal group.

23. The method of claim 1 further comprising:

determining that at least one network portal is to be assumed by a different surviving storage system; and generating an error message in response to determining that the at least one network portal is to be assumed by the different surviving storage system.

24. The method of claim 1 wherein the network portal data structure comprises a failover network module field.

25. The system of claim 18 further comprising a failover monitor configured to determine that at least one network portal is to be assumed by a different surviving network element module, and in response, generate an error message.

26. The system of claim 18 further comprising a network portal data structure configured to identify which target portal group is associated with each of the one or more network portals.

27. The system of claim 26 wherein the network portal data structure comprises a target portal group field.

* * * * *

UNITED STATES PATENT AND TRADEMARK OFFICE
CERTIFICATE OF CORRECTION

PATENT NO. : 7,797,570 B2
APPLICATION NO. : 11/290198
DATED : September 14, 2010
INVENTOR(S) : Joseph C. Pittman It is certified that error appears in the above-identified patent and that said Letters Patent is hereby corrected as shown below:

Col. 21, Line 6, please replace "ISCSI" with "iSCSI"

Col. 22, Line 29, please replace "systems" with "system"

Col. 23, Line 12, please replace "systems" with "system"

Col. 24, Line 39, please replace "modules" with "module"

Signed and Sealed this

Thirtieth Day of November, 2010

David J. Kappos
*Director of the United States Patent and Trademark Office*